US008923403B2

(12) United States Patent
Chen et al.

(10) Patent No.: US 8,923,403 B2
(45) Date of Patent: Dec. 30, 2014

(54) DUAL-LAYER FRAME-COMPATIBLE FULL-RESOLUTION STEREOSCOPIC 3D VIDEO DELIVERY

(71) Applicant: Dolby Laboratories Licensing Corporation, San Francisco, CA (US)

(72) Inventors: Tao Chen, Palo Alto, CA (US); Samir N. Hulyalkar, Los Gatos, CA (US); Gopi Lakshminarayanan, Fremont, CA (US)

(73) Assignee: Dolby Laboratories Licensing Corporation, San Francisco, CA (US)

( * ) Notice: Subject to any disclaimer, the term of this patent is extended or adjusted under 35 U.S.C. 154(b) by 0 days.

(21) Appl. No.: 14/345,570

(22) PCT Filed: Sep. 26, 2012

(86) PCT No.: PCT/US2012/057302
§ 371 (c)(1),
(2), (4) Date: Mar. 18, 2014

(87) PCT Pub. No.: WO2013/049179
PCT Pub. Date: Apr. 4, 2013

(65) Prior Publication Data
US 2014/0355693 A1    Dec. 4, 2014

Related U.S. Application Data

(60) Provisional application No. 61/541,005, filed on Sep. 29, 2011.

(51) Int. Cl.
*H04N 7/12*    (2006.01)
*H04N 19/186*    (2014.01)
*H04N 13/00*    (2006.01)

(52) U.S. Cl.
CPC ..... *H04N 19/00315* (2013.01); *H04N 13/0048* (2013.01); *H04N 13/0059* (2013.01)
USPC .................................................... 375/240.16

(58) Field of Classification Search
CPC ........................................................ H04N 7/50
USPC ..................................................... 375/240.16
See application file for complete search history.

(56) References Cited

U.S. PATENT DOCUMENTS 5,416,510 A    5/1995    Lipton
5,612,735 A    3/1997    Haskell
(Continued)

FOREIGN PATENT DOCUMENTS

WO    2013/040170    3/2013

OTHER PUBLICATIONS

Dolby Laboratories et al. "Dolby Open Specification for Frame-Compatible 3D Systems" Apr. 4, 2011, pp. 1-11.

(Continued)

*Primary Examiner* — Sath V Perungavoor
*Assistant Examiner* — James Pontius

(57) ABSTRACT

3D Images may be encoded into reduced resolution image data in a base layer and enhancement layer (EL) image data in one or more enhancement layers. Different types of data compositions may be used in the EL image data. The different types of data compositions may include unfiltered full resolution image data for one or both of left eye and right eye perspectives, or unfiltered full resolution image data for a color channel, e.g., luminance channel, or unfiltered full resolution image data for selected portions of image frames, or fallback data compositions. Based on deciding factors including bitrate requirements and bandwidth constraints, different types of data compositions may be alternatively used by an upstream device to deliver the best possible 3D image data to a wide variety of downstream devices. The upstream device may inform a downstream device of specific types of data compositions with EL image data descriptors.

22 Claims, 7 Drawing Sheets

(56) References Cited

U.S. PATENT DOCUMENTS

| | | | |
|---|---|---|---|
| 6,057,884 | A | 5/2000 | Chen |
| 7,515,759 | B2 | 4/2009 | Sun |
| 8,483,271 | B2 * | 7/2013 | Chen et al. ............... 375/240.02 |
| 8,619,852 | B2 | 12/2013 | Leontaris |
| 8,810,565 | B2 * | 8/2014 | Karaoguz et al. ............. 345/419 |
| 2006/0114993 | A1 | 6/2006 | Xiong |
| 2007/0019726 | A1 * | 1/2007 | Cha et al. .................. 375/240.12 |
| 2008/0310497 | A1 | 12/2008 | Amonou |
| 2009/0003437 | A1 * | 1/2009 | Cho et al. .................. 375/240.03 |
| 2009/0074060 | A1 * | 3/2009 | Kim et al. .................. 375/240.12 |
| 2009/0097549 | A1 * | 4/2009 | Kim et al. .................. 375/240.03 |
| 2009/0268806 | A1 | 10/2009 | Kim |
| 2010/0110163 | A1 | 5/2010 | Bruls |
| 2010/0165077 | A1 | 7/2010 | Yin |
| 2010/0202540 | A1 | 8/2010 | Fang |
| 2010/0231593 | A1 | 9/2010 | Zhou |
| 2010/0238274 | A1 | 9/2010 | Kim |
| 2010/0260268 | A1 | 10/2010 | Cowan |
| 2011/0002383 | A1 * | 1/2011 | Yoshida et al. .......... 375/240.12 |
| 2011/0012994 | A1 | 1/2011 | Park |
| 2011/0074922 | A1 | 3/2011 | Chen |
| 2011/0122230 | A1 | 5/2011 | Boisson |
| 2011/0134214 | A1 | 6/2011 | Chen |
| 2011/0216833 | A1 | 9/2011 | Chen |
| 2011/0261877 | A1 | 10/2011 | Choi |
| 2012/0092452 | A1 * | 4/2012 | Tourapis et al. ................ 348/43 |
| 2012/0133736 | A1 * | 5/2012 | Nishi et al. ..................... 348/43 |
| 2012/0268558 | A1 * | 10/2012 | Choi et al. ...................... 348/42 |

OTHER PUBLICATIONS

Hewage, C. T. et al "Quality Evaluation of Color Plus Depth Map-Based Stereoscopic Video" IEEE Journal of Selected Topics in Signal Processing, vol. 3, No. 2, Apr. 2009, pp. 304-318.

Vetro, A et al "3D-TV Content Storage and Tranmission" Mitsubishi Electric Research Laboratories, TR2011-023, Jan. 2011.

Quan, J et al. "Asymmetric Spatial Scalability in Stereoscopic Video Coding" IEEE 2011.

Tseng, B et al. "Compatible Video Coding of Stereoscopic Sequences Using MPEG-2's Scalability and Interlaced Structure" International Workshop on HDTV 1994.

ATSC "Final Report of the ATSC Planning Team on 3D-TV" Aug. 31, 2011.

Ji, X et al. "Three-Dimensional Subband Scalable Video Coding Embedded with H.264/AVC Codec" published by Visual Communications and Image Processing 2005.

Aflaki, P. et al "Subjective Study on Compressed Asymmetric Stereoscopic Video" Proc. of 2010 IEEE 17th International Conference on Image Processing, Sep. 26-29, 2010, Hongkong, pp. 4021-4024.

ITU-T and ISO/IEC JTC 1, "Advanced Video Coding for Generic Audiovisual Services", ITU-T Recommendation H.264 and ISO/IEC 14496, Mar. 2009.

Stelmach, L et al. "Stereo Image Quality: Effects of Mixed Spatio-Temporal Resolution" IEEE Transactions on Circuits and Systems for Video Technology, vol. 10, No. 2, Mar. 2000, pp. 188-193.

* cited by examiner

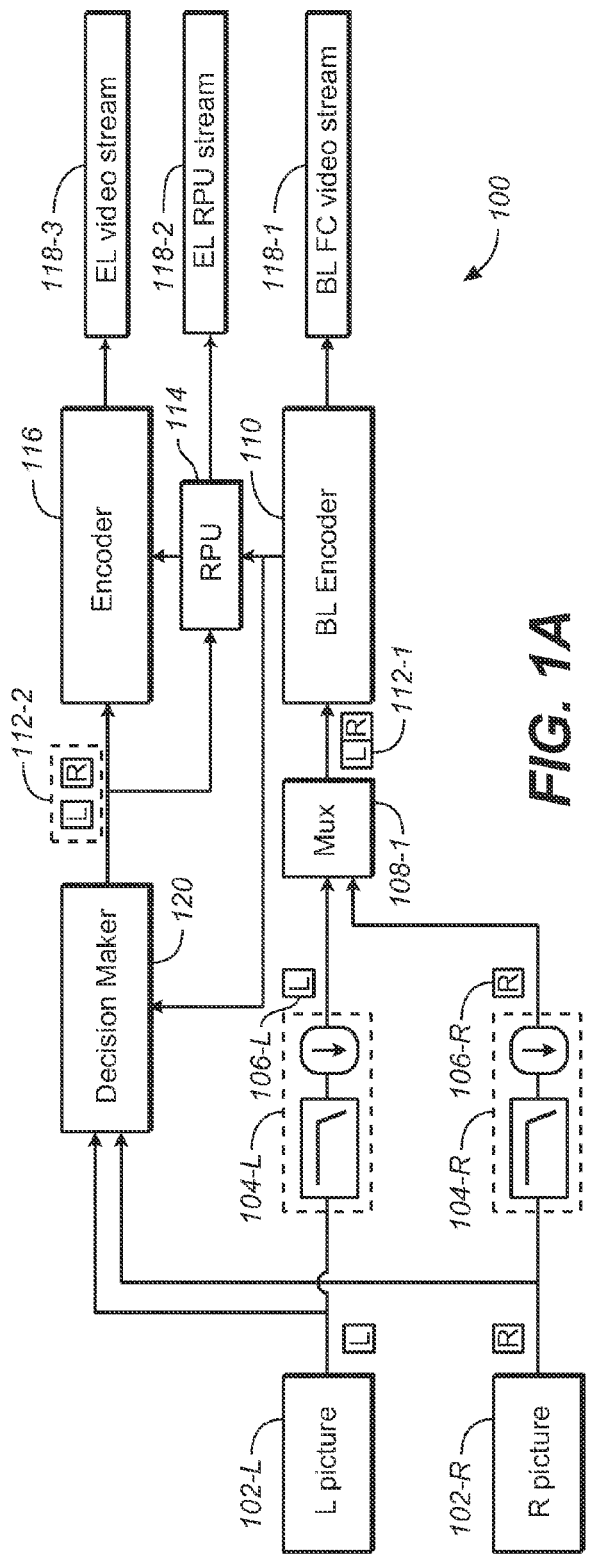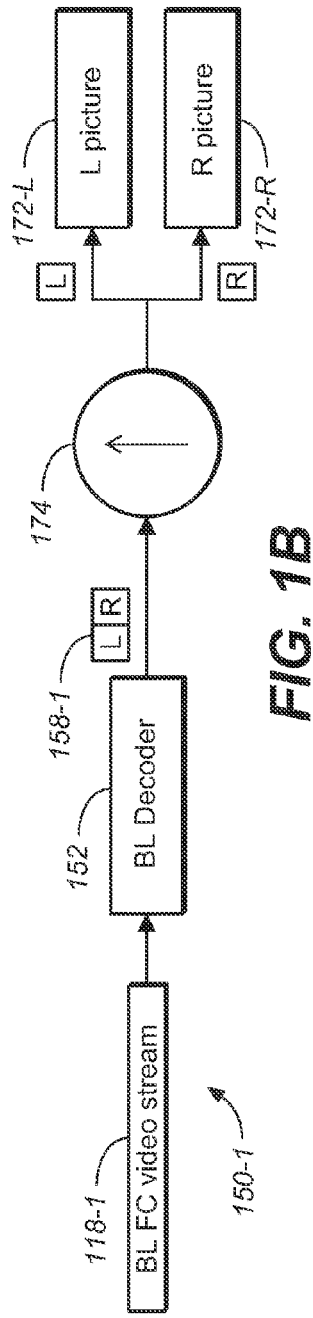
FIG. 1A
FIG. 1B

DUAL-LAYER FRAME-COMPATIBLE FULL-RESOLUTION STEREOSCOPIC 3D VIDEO DELIVERY

CROSS-REFERENCE TO RELATED APPLICATIONS

This application claims priority to U.S. Provisional Patent Application No. 61/541,005 filed 29 Sep. 2011, which is hereby incorporated by reference in its entirety.

TECHNOLOGY

The present invention relates generally to image data. More particularly, an example embodiment of the present invention relates to image data for stereoscopic 3D images

BACKGROUND

Frame-compatible half resolution (FCHR) solutions for 3D content delivery suffer from degraded spatial resolution because the half resolution 3D content only contains half resolution image frames subsampled from full resolution 3D image frames.

Frame-compatible full resolution (FCFR) solutions may be used to produce full resolution 3D image frames by sending half resolution 3D image frames through a base layer and sending complementary half resolution 3D image frames through an enhancement layer. The half resolution 3D image frames and the complementary half resolution 3D image frames may be combined by a recipient device into 3D image frames at full resolution.

However, the dual-layer FCFR solutions implement low-pass filtering to reduce/remove aliasing in the half resolution image frames. As high frequency content in the image frames is removed by low-pass filtering, it is not possible for a downstream device to recover all the fine details and textures that were in the high spatial frequency content. While full resolution 3D image frames might still be constructed, the pixels in the 3D image frames would have been irreversibly altered by low-pass filtering and could not be used to reproduce the original resolution and sharpness in original 3D content that gives rise to the 3D image frames.

The approaches described in this section are approaches that could be pursued, but not necessarily approaches that have been previously conceived or pursued. Therefore, unless otherwise indicated, it should not be assumed that any of the approaches described in this section qualify as prior art merely by virtue of their inclusion in this section. Similarly, issues identified with respect to one or more approaches should not assume to have been recognized in any prior art on the basis of this section, unless otherwise indicated.

BRIEF DESCRIPTION OF DRAWINGS

The present invention is illustrated by way of example, and not by way of limitation, in the figures of the accompanying drawings and in which like reference numerals refer to similar elements and in which:

FIG. 1A illustrates an example multi-layer 3D video encoder, FIG. 1B illustrates an example base-layer 3D video decoder.

DESCRIPTION OF EXAMPLE EMBODIMENTS

Figure 1C:
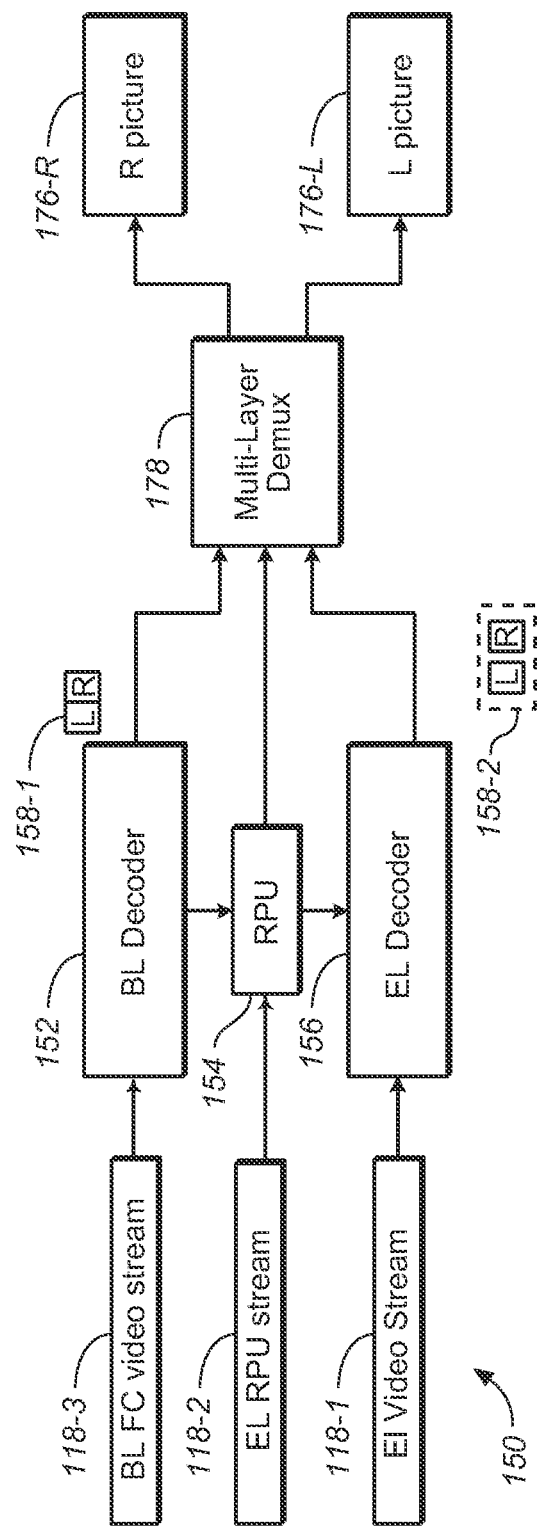
FIG. 1C illustrates an example multi-layer 3D video decoder.

Example embodiments, which relate to perceptual luminance nonlinearity-based image data exchange across different display capabilities, are described herein. In the following description, for the purposes of explanation, numerous specific details are set forth in order to provide a thorough understanding of the present invention. It will be apparent, however, that the present invention may be practiced without these specific details. In other instances, well-known structures and devices are not described in exhaustive detail, in order to avoid unnecessarily occluding, obscuring, or obfuscating the present invention.

Example embodiments are described herein according to the following outline:

1. GENERAL OVERVIEW
2. MULTI-LAYERED VIDEO DELIVERY
3. IMAGE CONTAINERS AND IMAGE DATA COMPOSITIONS
4. EXAMPLE IMAGE DATA COMPOSITIONS
   4.1. COMPLEMENTARY IMAGE DATA
   4.2. UNFILTERED FULL RESOLUTION IMAGE DATA FOR ONE OF THE TWO PERSPECTIVES
   4.3. RESOLUTION-ASYMMETRIC UNFILTERED LUMINANCE IMAGE DATA
   4.4. SELECTED PORTIONS OF UNFILTERED FULL RESOLUTION IMAGE DATA
   4.5. SELECTED PORTION OF UNFILTERED FULL RESOLUTION LUMINANCE IMAGE DATA FOR ONE OF THE PERSPECTIVES
   4.6. FALLBACK OR ALTERNATIVE IMAGE DATA COMPOSITION
5. EXAMPLE PROCESS FLOWS
6. IMPLEMENTATION MECHANISMS—HARDWARE OVERVIEW
7. EQUIVALENTS, EXTENSIONS, ALTERNATIVES AND MISCELLANEOUS

1. GENERAL OVERVIEW

This overview presents a basic description of some aspects of an example embodiment of the present invention. It should be noted that this overview is not an extensive or exhaustive summary of aspects of the example embodiment. Moreover, it should be noted that this overview is not intended to be understood as identifying any particularly significant aspects or elements of the example embodiment, nor as delineating any scope of the example embodiment in particular, nor the invention in general. This overview merely presents some concepts that relate to the example embodiment in a condensed and simplified format, and should be understood as merely a conceptual prelude to a more detailed description of example embodiments that follows below.

When video data is delivered through network connections from internet-based content providers, the bitrate allocated to a recipient display application such as a 3D display application on a computing device is limited and may significantly vary over time, especially during peak network access times such as evening times.

To support a widest possible variety of 3D image rendering devices, 3D image content may be delivered as frame compatible 3D image frames (or pictures) with reduced resolutions. As discussed, 3D image frames may be subsampled from full resolution 3D image frames to reduced resolution 3D image frames; high spatial frequency content in the full resolution 3D image frames may be removed by low-pass filters to prevent aliasing in the subsampled image frames.

Embodiments of the present invention exploit the perceptual redundancy and inter-ocular masking effect in human vision in the case of stereoscopic 3D viewing. When 3D image frames of two different perspectives of a 3D image are viewed (at the same time or in a frame-sequential manner), human eyes tend to perceive the 3D image at the resolution of an image frame, out of the two image frames of the 3D image, that has more image details than the other image frame. Human vision is also more adapted at detecting differences in luminance levels rather than chroma values.

Embodiments include encoding and providing multi-layer 3D image data to downstream devices. In some example embodiments, while frame compatible reduced resolution left-eye (LE) and right-eye (RE) image frames of a 3D image are provided in a base layer to a recipient device, additional 3D image data of the 3D image is provided for a specific perspective and/or for one or more specific color channels in one or more enhancement layers, separate from the base layer, to the recipient device. The additional 3D image data may be used by the recipient device to improve the quality of an output 3D image.

A number of different types of image containers associated with different color spaces and/or different sampling rates may be used to carry enhancement layer image data. For each in the number of different types of image containers, a number of different types of data compositions may be used to carry enhancement layer (EL) image data. In an example embodiment, a downstream device is provided with EL image data—for a 3D image in a sequence of 3D images—that comprises at least a portion of full resolution unfiltered image data for a perspective (which may be a left eye perspective or a right eye perspective) and/or for a color channel.

Different amounts of unfiltered image data may be provided for different perspectives and/or for different color channels of an adopted color space (e.g., RGB, YCbCr, etc.). The unfiltered image data may be used by a multi-layer capable downstream device to improve resolutions of image frames decoded from one or more base layer video signals. For example, a color channel (e.g., luminance) of an output 3D image frame (e.g., a left eye image frame) may be populated with unfiltered image data (e.g., luminance image data). The resultant output 3D image frames may or may not be resolution symmetric.

As used herein, the term "color channel" refers to components in a color space. In a RGB color space, color channels may comprise red, green and blue color channels. In an YCbCr color space, color channels may comprise luminance and chroma channels. Thus, a color channel as described herein may refer to a grayscale channel such as a luminance channel. As used herein, the term "a portion of full resolution unfiltered image data" may refer to unfiltered full resolution image data in a color channel.

Adaptive switching of different types of data compositions may be used by an upstream device to deliver the best possible quality EL image data to a downstream device. As used herein, the term "quality" may be measured by perceptible image details reproducible in output 3D images.

In an example embodiment, an upstream device such as a content provider server is configured to determine, based on one or more deciding factors, a specific type of data composition to carry at least a portion of full resolution unfiltered 3D image data to a recipient device. As a part of this determination, the upstream device may select the specific type of data composition to transmit the best quality image data in the enhancement layers. EL image data may be for a specific perspective, both perspectives, and/or one or more specific color channels.

Examples of deciding factors as described herein may include, but are not limited only to, respective bandwidth requirements of different types of data compositions, a bandwidth constraint on a current network connection between the upstream device and the recipient device, a maximal, average, or minimal bitrate supported by the current network connection, and/or quality of services (packet loss, bit error, etc.) of the current network connection.

An EL image data descriptor may be provided along with EL image data to signal presence of the EL image data in specific perspectives and/or specific color channels in the enhancement layers. The EL image data descriptor may comprise parity information which indicates perspectives associated with different data portions of the EL image data, and channel information which indicates channels associated with different data portions of the EL image data. The EL image data descriptor may be transmitted as a part of supplemental enhancement information (SEI) or other similar metadata carriages available in video bitstreams.

In an example embodiment, an downstream device such as an image rendering device is configured to receive video signals including multi-layer image data as described herein, and to determine, based on an EL image data descriptor received, whether EL image data is available for a specific perspective and/or one or more specific color channels. If that is the case, the downstream device decodes the EL image data accordingly from one or more input video signals for the specific perspective and/or the one or more specific color channels, and uses the decoded EL image data to improve/replace corresponding portions in the filtered reduced resolution image frames constructed from a base layer.

Because the perception of quality and sharpness of the 3D image is strongly weighted toward the eye viewing the greater amount of detectable image details, absolute and relative resolutions for LE and RE image frames coded in video signals as described herein may be differentially adjusted for specific perspectives and/or specific color channels. Adjusting resolutions may be based on the previously mentioned deciding factors, and may be made dynamically, manually, from program to program, etc.

Codecs implementing techniques as described herein may be configured to include inter-layer prediction capabilities to fully exploit statistical redundancy between base layer (BL) image data and original unfiltered full resolution input image data. EL image data may (possibly only) carry residual (or differential) image data, instead of carrying a large amount of full resolution unfiltered image data without exploiting the statistical redundancy in image data of different layers. The residual image data as provided in the enhancement layers enables downstream devices to efficiently construct an image frame with at least a portion of full resolution unfiltered image data. For example, prediction parameters to generate a prediction reference frame or prediction reference values therein may be provided to a recipient device along with the residual image data. Unfiltered full resolution image data may be reconstructed at the recipient device by adding the residual image data on top of the prediction reference frame or the prediction reference values therein reconstructed based at least in part on the prediction parameters received and the BL image data.

In some example embodiments, the codecs may be configured to include inter-view prediction capability used as described in ITU-T Recommendation H.264 and ISO/IEC 14496-10. In some example embodiments, a RPU (reference processing unit) may be used to improve efficiency in inter-layer prediction for enhancement layer compression.

In some example embodiments, data needed for other applications may also be included with full resolution unfiltered image data in the enhancement layers. In some example embodiments, features, as provided by FCFR technologies commercially available from Dolby Laboratories in San Francisco, Calif., may be supported by the base and enhancement layers as described herein.

Embodiments of the present invention may minimize bandwidth or bitrate usage and preserve frame-compatible 3D image data with reduced resolution, which can support various televisions, displays and other image rendering devices. Moreover, reuse and adaptation features and improvement capability of some available system components allows relatively low cost implementation as compared with other approaches that do not use techniques as described herein.

Techniques as described herein alternate among different types of data compositions of EL image data to achieve the best 3D image quality under varying network conditions, require much less data volume, but still provide subjective picture quality similar to that of using much more data to provide resolution symmetric 3D image data with full resolution unfiltered image data for both the left and right eyes under other techniques.

In some example embodiments, mechanisms as described herein form a part of a media processing system, including but not limited to: a handheld device, game machine, television, laptop computer, netbook computer, tablet computer, cellular radiotelephone, electronic book reader, point of sale terminal, desktop computer, computer workstation, computer kiosk, or various other kinds of terminals and media processing units.

Various modifications to the preferred embodiments and the generic principles and features described herein will be readily apparent to those skilled in the art. Thus, the disclosure is not intended to be limited to the embodiments shown, but is to be accorded the widest scope consistent with the principles and features described herein.

2. MULTI-LAYERED VIDEO DELIVERY

FIG. 1A shows a multi-layer 3D video encoder (100), in accordance with an example embodiment. In an example embodiment, the multiple-layer video encoder (100) is configured to encode an input 3D video sequence that consists of a sequence of 3D input images. In an example embodiment, a 3D input image in the sequence of 3D images comprises full resolution unfiltered 3D image data (including but not limited only to high spatial frequency content) at least a portion of which may be carried in one or more output video signals generated by the multi-layer 3D video encoder (100). As used herein, the term "full resolution" may refer to a spatial resolution maximally supported by the total number of independently settable pixels in an image frame. In an example embodiment, image data constituting a 3D input image in the sequence of 3D images may be decoded into an input left-eye (LE) image frame (102-L) and an input right-eye (RE) image frame (102-R) of the 3D input image.

In an example embodiment, one or more filtering mechanisms (e.g., 104-L and 104-R) in the multi-layer 3D video encoder (100) generates filtered LE and RE image data (106-L and 106-R) based on the input LE and RE image frames (102-L and 102-R). The filtered LE and RE image data (106-L and 106-R) may be generated by removing all, or a substantial part, of the high spatial frequency content from the input LE and RE image frames (102-L and 102-R). Filtering may be performed with one or more low-pass filters (LPFs) in the filtering mechanisms (e.g., 104-L and 104-R). In an example embodiment, filtering as described herein removes or substantially dampens any spatial frequency content in the input images above a threshold frequency that corresponds to a fraction (e.g., half, one third, etc.) of the full resolution supported by the input LE and RE image frames (102-L and 102-R).

As used herein, the term "high spatial frequency content" may refer to high spatial frequency image details that exist in an input 3D video sequence but are removed from the filtered image data, for example, by low-pass filters, for anti-aliasing purposes. If the removal of the high spatial frequency content had occurred, it would have been irreversible in that downstream devices would not be able to reproduce high resolution image details with filtered image data.

In an example embodiment, one or more samplers (e.g., down-samplers as illustrated in 104-L and 104-R of FIG. 1A with downward-pointing arrows), which may be implemented as a part of, or in addition to, the filtering mechanisms (104-L and 104-R), performs sampling (down-sampling) as a part of generating the filtered LE and RE image data (106-L and 106-R). In an example embodiment, the samplers separate filtered LE image data into two halves, one of which comprises a subsampled (e.g., every odd numbered column; every odd numbered row; or other interleaving decompositions of columns and/or rows) LE image data portion, while the other of which comprises a complementary subsampled (e.g., every even numbered column; every even numbered row; or other interleaving decompositions of columns and/or rows) LE image data portion. Similarly, the samplers separate filtered RE image data into two halves, one of which comprises a subsampled (e.g., every odd numbered column, every odd numbered row; or other interleaving decompositions of columns and/or rows) RE image data portion, while the other of which comprises a complementary subsampled (e.g., every even numbered column, every even numbered row; or other interleaving decompositions of columns and/or rows) RE image data portion.

In an example embodiment, a multiplexer (e.g., Mux 108-1) multiplexes the filtered LE and RE image data (106-L and 106-R) into a multiplexed 3D image frame (112-1). A multiplexed 3D image frame (112-1) comprises both a (e.g., down-sampled) image data portion for the left eye and a (e.g., down-sampled) image data portion for the right eye. The multiplexed 3D image frame may be decoded by a downstream device into a LE image frame and a RE image frame of reduced resolutions (e.g., half resolutions, etc.), which are less than 100% of the full resolution. Such decoded LE and RE image frames of the reduced resolution may be upsampled to comprise the same number of pixels as a full resolution image frame with a less defined appearance than a full resolution image not obtained by an upsampling operation.

In an example embodiment, the multiplexed 3D image frame (112-1) comprises image data for one half (e.g., every other column, or every other row) of the total number of pixels in a full resolution image frame for the left eye and the other half for the right eye. Reduced resolution LE and RE image data portions may be multiplexed within a multiplexed 3D image frame (e.g., 112-1) in a side-by-side format, an over-under format, a quincunx format, a checkerboard format, an interleaved format, a combination of the foregoing formats, or another multiplex format.

One or more enhancement layers may be used to carry output video signals with at least a portion of unfiltered high spatial frequency content for one or both of the LE and RE perspectives and/or for one or more of color channels in one or both of the LE and RE perspective. In an example embodiment, the BL encoder (110) generates, based at least in part on the multiplexed 3D image frame (112-1), a base layer video signal to be carried in a base layer frame compatible video stream (BL FC video stream 118-1), while the EL encoder (116) generates, based at least in part on one of the (unfiltered) input LE image frame (102-L) and the (unfiltered) input RE image frame (102-R), an enhancement layer video signal with unfiltered high spatial frequency content for specific perspectives and/or specific channels to be carried in an enhancement layer video stream (EL video stream 118-1), which may or may not be frame compatible. One or both of the BL encoder (110) and the EL encoder (116) may be implemented using one or more of a plurality of codecs, such as H.264/AVC, VP8, VC-1, and/or others.

An enhancement layer video signal as described herein may be generated using a hybrid video coding method (e.g., implemented by video codecs, such as VC-1, H.264/AVC, and/or others). The image data in an LE or RE image frame with at least a portion of unfiltered full resolution image data may be predicted either from neighboring samples in the same image frame (using intra prediction) or from samples from past decoded image frames (inter prediction) that belong to the same layer and are buffered as motion-compensated prediction references within a prediction reference image frame buffer. Inter-layer prediction may also be at least in part based on decoded information from other layers (e.g., the base layer).

Additionally and/or optionally, the multi-layer 3D video encoder (100) may comprise a reference processing unit (RPU 114) that performs one or more operations relating to prediction. Prediction as implemented by a reference processing unit may reduce the overhead in constructing an image frame with at least a portion of unfiltered full resolution image data in a multi-layer 3D video decoder (e.g., 150 of FIG. 1C). The RPU (114) may receive BL image data from the BL Encoder 110, and generate a prediction reference image frame through intra or inter prediction (or estimation, or other methods).

In an example embodiment, a decision maker (120) extracts EL image data from the (unfiltered) input LE image frame (102-L) and the (unfiltered) input RE image frame (102-R) and stores the EL image data into an enhancement layer image frame (112-2). The EL image frame (112-2) may comprise image data from only one of the (unfiltered) input LE image frame (102-L) and the (unfiltered) input RE image frame (102-R). Alternatively and/or optionally, the EL image frame (112-2) may comprise image data from both of the (unfiltered) input LE image frame (102-L) and the (unfiltered) input RE image frame (102-R). Alternatively and/or optionally, the EL image frame (112-2) may comprise image data from different color channels in one or both of the (unfiltered) input LE image frame (102-L) and the (unfiltered) input RE image frame (102-R).

The EL image frame (112-2) may be decoded by a downstream device into different portions of image data at least one of which is unfiltered full resolution image data. The downstream device may combine filtered image data in the base layer (112-1) with the image data in the enhancement layers (112-2) to produce one or more output image frames of higher resolutions than those of image frames constructed entirely from the filtered image data in the base layer (112-1).

In an example embodiment, the decision maker (120) is configured to generate an EL image data descriptor that describes the EL image data (112-2) in the EL video stream (118-3). Values of one or more fields in the EL image data descriptor may be numeric values, character-based values, a combination of the foregoing, or other types of representative value, so long as the values of the EL image data descriptor indicate the data composition, such as specific perspectives and/or color channels, of the EL image data (112-2) in the EL video stream (118-3). The decision maker (120) is configured to decide the values for the EL image data descriptor based on one or more of base layer image data, the (unfiltered) input LE image frame (102-L), and the (unfiltered) input RE image frame (102-R). In an example embodiment, the decision maker (120) provides the EL image data descriptor to the RPU (114). The EL image data descriptor and identifying information of image frames associated with the EL image data descriptor may be signaled (e.g., as a part of SEI) to downstream devices using the EL RPU stream (118-2). In an example embodiment, the decision maker (120) is configured to set up a data flow path for the EL image data (112-2) to be provided to the EL encoder (116). The EL image data (112-2) is then encoded by the EL encoder (116) into one or more EL video signals.

In those example embodiments that make use of such predictions, the EL encoder (116) generates, based at least in part (a) one or both of the unfiltered input LE image frame (102-L) and the unfiltered input RE image frame (102-R) and (b) the prediction reference image frame, unfiltered image residuals (differences between the prediction reference image frame and at least a portion of unfiltered full resolution image data of the unfiltered input LE image frame (102-L) and the unfiltered input LE image frame (102-L)) as the EL image data (112-2), encodes the EL image data (112-2) in the enhancement layer video signal to be carried in the EL video stream (118-3). Further, the RPU (114) generates, based at least in part on the prediction reference image frame, a reference video signal to be carried in an enhancement layer (EL) RPU stream (118-2).

Decisions made by the multi-layer 3D video encoder (100), or the decision maker (120) therein, guide the creation of one or more enhancement layer bitstreams. Therefore, the decisions are transmitted with one or more video signals to downstream devices for them to be used by the downstream devices for correctly constructing output 3D image frames with the EL image data. Such a signal may be carried in the EL RPU stream (118-2) or transmitted in other similar ways. Additionally and/or optionally, an index to indicate any needed filtering by downstream devices may be provided to the downstream devices for the purpose of constructing LE or RE output image frames on the video decoder side.

In some embodiments, different perspectives may carry different portions (including zero amount) of unfiltered full resolution image data at different times; different color channels in the same perspective may also carry different portions (including zero amount) of unfiltered full resolution image data at different times. It may be possible for users to notice the "flicker" associated with these changes of unfiltered full resolution image data in different perspectives and/or color channels. In some example embodiments, this may be ameliorated at the receiver/decoder side via one or more advanced post-processing techniques, for example, by interpolating missing pixels using methods such as motion-estimation-motion-compensation (MEMC), or 3D interpolation techniques.

In some example embodiments, alternating different types of data compositions in the enhancement layers may be implemented with a small transition period, such as a fraction of a second, a second, multiple seconds, a frame, multiple frames, a scene, multiple scenes, a program, multiple programs, or other time intervals. For example, when a first data composition containing unfiltered LE image data is replaced by a second data composition containing unfiltered RE image data in the EL image data (112-2), a multi-layer 3D video encoder (e.g., 100) as described herein may gradually (in successive frames; to avoid abruptly switching in a single frame) scale down full resolutions of unfiltered LE image data to a transition resolution comparable to (equal to, within the same resolution range as, within five (5) or another small percentile of difference in resolution from, etc.) the resolutions of filtered RE image frames in the base layer. When the transition resolution is reached by the scaled down LE image data in the EL image data (112-2), unfiltered RE image data scaled down to a starting resolution comparable to the transition resolution are encoded into the EL image data (112-2) (including the EL reference layer in some example embodiments). The multi-layer 3D video encoder (100) may gradually (in successive frames) scale up RE image data in the EL image data (112-2) from the starting resolution to full resolutions of unfiltered RE image data.

In some example embodiments, gradually transitioning resolutions when alternating different types of data compositions in the enhancement layers may be performed by a downstream device. For example, a multi-layer 3D video encoder (e.g., 100) may select a filter from a predetermined set of filters. The filter, when applied, may gradually reduce resolutions for one eye and gradually increase resolutions for the other eye in image data carried in the enhancement layers. In an example embodiment, the multi-layer 3D video encoder (100) may include a filter index in RPU data carried in the EL RPU stream. The filter index may be used by a downstream device to look up a preconfigured set of available filters and to determine which one of the preconfigured set of available filters should be applied to gradually transition resolutions of image frames between different types of data compositions.

FIG. 1B shows a base-layer video decoder (150-1) that processes one or more input video signals in which high spatial frequency content has been removed from an original video sequence (which may be the input video sequence as discussed in connection with FIG. 1A), in accordance with an example embodiment. In an example embodiment, the base-layer video decoder (150-1) is configured to decode a BL input video signal as received from a base layer (BL FC video stream 118-1 of FIG. 1B) into a sequence of output 3D images, while video signals in other layers may or may not be present in physical signals received by the decoder. In an example embodiment, the base-layer video decoder (150-1) is preconfigured, or alternatively dynamically or manually configured, to ignore any presence of video signals in other streams other than the BL FC video stream (118-1).

An output 3D image in the sequence of output 3D images as produced by the base layer video decoder (150-1) does not comprise full resolution unfiltered 3D image data, as high spatial frequency content in the original video sequence that gives rise to the input video signals has been filtered/removed from input video signals processed by the base layer video decoder (150-1) and cannot be recovered from such input video signals by the base-layer video decoder (150-1).

In an example embodiment, a BL decoder (152 of FIG. 1B) generates, based at least in part on the BL input video signal in BL FC video stream (118-1 of FIG. 1B), a multiplexed 3D image frame (158-1 of FIG. 1B). The BL decoder (152 of FIG. 1B) may be implemented using any available or future video codecs, such as H.264/AVC, VP8, VC-1, etc.

In an example embodiment, an upsampling unit (174) demultiplexes and/or separates the multiplexed 3D image frame (158-1) into two image data portions. While the multiplexed 3D image frame (158-1) comprises multiplexed filtered image data for both perspectives, the image data portions comprise a filtered LE image data portion and a filtered RE image data portion, each of which is at a reduced resolution below the full resolution. In an example embodiment, the upsampling unit (174) upsamples the filtered LE image data portion to form an upsampled LE filtered output image frame (172-L) below the full resolution. Similarly, the upsampling unit (174) upsamples the filtered RE image data portion to form an upsampled RE filtered output image frame (172-R) below the full resolution. Even though each of the upsampled LE and RE filtered image frames (172-L and -R) may comprise the same number of pixels as a full resolution image frame, the rendered 3D image with the upsampled LE and RE filtered image frames (172-L and -R) has a less defined appearance than a 3D image made up of full resolution LE and RE image frames not obtained by an upsampling operation. In addition, the upsampled LE and RE filtered image frames (172-L and -R) do not have high spatial frequency image details removed in the encoding process of the input video signals in the base layer.

The upsampled LE and RE filtered image frames (172-L and -R) below the full resolution may be rendered by a display device (which for example may comprise the base-layer video decoder 150-1) to present an output 3D image. Rendering the upsampled LE and RE filtered image frames (172-L and -R) may, but is not limited to, be in a frame-sequential manner.

FIG. 1C illustrates a multi-layer 3D video decoder (150) that processes input video signals comprising unfiltered high spatial frequency content, in accordance with an example embodiment. In an example embodiment, the input video signals are received in multiple layers (or multiple bitstreams) comprising a base layer and one or more enhancement layers. As used herein, the term "multi-layer" or "multiple layers" may refer to two or more bitstreams that carry video signals having one or more logical dependency relationships between one another (of the video signals).

In an example embodiment, the multi-layer 3D video decoder (150) is configured to decode one or more input video signals in the BL FC video stream (118-1 of FIG. 1C), EL RPU stream (118-2 of FIG. 1C), and EL video stream (118-3 of FIG. 1C) into a sequence of output 3D images. In an example embodiment, an image frame of an output 3D image in the sequence of output 3D images comprises at least a portion of unfiltered full resolution image data.

The multi-layer 3D video decoder (150) may combine image data received in one or more enhancement layers (e.g., EL RPU stream 118-2 and EL FC video stream 118-3) with image data received in a base layer (e.g., BL FC video stream 118-1) to produce output image frames.

In an example embodiment, a BL decoder (152) generates a multiplexed 3D image frame (158-1) based at least in part on a BL video signal in BL FC video stream (118-1). The multiplexed 3D image frame (158-1) comprises multiplexed filtered image data for both perspectives. The multiplexed filtered image data comprises a first filtered image data portion for a first perspective (e.g., left-eye view) and a second filtered image data portion for a second perspective (e.g., right-eye view).

In an example embodiment, an EL decoder (156) generates an EL image frame (158-2) comprising EL image data, which may contain at least a portion of unfiltered full resolution image data existing in an original input video sequence (e.g., the input video sequence of FIG. 1A) based at least in part on an EL video signal in EL video stream (118-3 of FIG. 1C).

One or both of the BL decoder (152) and the EL decoder (156) may be implemented using any available or future video codecs, such as H.264/AVC, VP8, VC-1, etc.

In an example embodiment, a multi-layer demultiplexer (178) is configured to receive intermediate image data from the BL encoder (152), the RPU (154) and the EL decoder (156). The intermediate image data may comprise (a) the multiplexed 3D image frame (158-1), (b) the EL image frame (158-2) with the EL image data, (c) prediction parameters to generate a prediction reference image frame or prediction reference values, and/or (d) an EL image data descriptor.

In an example embodiment, the multi-layer demultiplexer (178) is configured to separate and upsample the first and second filtered image data portions in the multiplexed 3D image frame (158-1) to form a first upsampled filtered output image frame for the first perspective and a second upsampled filtered output image frame for the second perspective, below the full resolution. Even though an upsampled filtered image frame as described herein may comprise the same number of pixels as a full resolution image frame, the upsampled filtered image frame has a less defined appearance than a full resolution image frame not obtained by an upsampling operation. In addition, the upsampled filtered image frame does not have high spatial frequency image details removed in the encoding process of the input video signals to the multi-layer decoder (150).

The EL image frame (158-2) may comprise a third image data portion for the first perspective (e.g., left-eye view) and a fourth image data portion for the second perspective (e.g., right-eye view). In some example embodiments, the third image data portion and the fourth image data portion comprise at least a portion of unfiltered full resolution image data.

In an example embodiment, the multi-layer demultiplexer (178) is configured to separate the third and fourth image data portions in the EL image frame (158-2) from each other. The multi-layer demultiplexer (178) may separate the third and fourth image data portions based on the EL image data descriptor received from the RFU (154).

In those example embodiments that make use of such predictions, the multi-layer demultiplexer (178) generates, based at least in part on the first and third image data portions and prediction parameters, a first output image frame for the first perspective (e.g., 176-L). the multi-layer demultiplexer (178) may also generate, based at least in part on the second and fourth image data portions and prediction parameters, a second output image frame for the second perspective (e.g., 176-R). In various embodiments, zero, one or both of the first and second output image frames comprises unfiltered high spatial frequency content.

The first output image frame (176-L) and the second output image frame (176-R) may be rendered by a display device (which for example may comprise the multi-layer 3D video decoder (150) to present an output 3D image. Rendering the RE and LE image frames may, but is not limited to, be in a frame-sequential manner.

3. IMAGE CONTAINERS AND IMAGE DATA COMPOSITIONS

In some embodiments, a downstream device (which may be a display device incorporating a multi-layer 3D video decoder 150 of FIG. 1C) generates full resolution (FR) image frames when both BL and EL video streams are available in input video signals along with a RPU stream. A multi-layer decoder (150) as illustrated in FIG. 1C may be used to reconstruct the full solution image frames based at least in part on EL image data (112-2 of FIG. 1A, or 158-2 of FIG. 1C) transmitted in one or more enhancement layers.

In various embodiments, a multi-layer 3D video encoder (e.g., 100 of FIG. 1A) provides a plurality of different types of EL image data (e.g., 112-2) to downstream devices. Each of the plurality different types of EL image data (112-2) may comprise a different data composition of the EL image data. A different data composition of the EL image data corresponds to a different combination of portions of unfiltered full resolution image data in the EL image data.

An upstream device (which may comprise a multi-layer 3D video encoder 100 of FIG. 1A) may adaptively switch/transition the image data content of output video signals by alternating different data compositions of EL image data over time. Multiple portions of unfiltered full resolution image data may be multiplexed within the EL image data in a time domain multiplexing manner. The adaptive content switching/transitions may occur at a fraction of a second, a second, multiple seconds, a frame, multiple frames, a scene, multiple scenes, a program, multiple programs, or other time intervals. One or more deciding factors including those related to signal characteristics, image content, bitrate requirements, bandwidth constraints, network conditions, etc. may be used as a basis for determining whether and when a different combination of portions of unfiltered full resolution image data should be carried in a time domain multiplexing manner in the EL layers.

Under techniques as described herein, a variety of different types of image containers may be used to carry EL image data. As used herein, the term "an image container" may refer to an image data structure to hold pixel values and/or associated metadata; the image container may be standard-based, proprietary, or defined with an extension from a standard or proprietary specification. An image container may be defined to hold one or more image frames. In an example embodiment, an image container defined for a single image frame may be used to carry multiplexed data portions (e.g., from different perspectives and/or different color channels) of image data (e.g., unfiltered full resolution image frames 102-L and 102-R of FIG. 1A). As used herein, "hold image data in an image container" may mean that the image data may be logically mapped into a specific image data structure of the image container.

A first example type of image container may be one that is defined to hold red, green, and blue color channel values in an RGB color space (sRGB, adobeRGB, or other RGB color spaces). A second example type of image container may be one that is defined to hold luminance and chroma values in an YCbCr color space. Other types of image containers may be equivalently used under techniques as described herein.

Under techniques as described herein, a variety of different sampling schemes may be used with image containers to hold EL image data. A first example sampling scheme may be 4-4-4 in which no subsampling is performed on color channels (or components) of an image container. A second example sampling scheme may be 4-2-2 in which subsampling may be performed on two out of three color channels of an image container. A third example sampling scheme may be 4-2-0 in which additional subsampling may be performed on top of the subsampling performed in the 4-2-2 sampling scheme. Other sampling schemes, such as complementary sampling and common sampling, may also be used under techniques as described herein.

For the purpose of illustration only, a 4-2-0 sampling scheme in an YCbCr color space may be used in illustrating some techniques as described herein. It should be noted that other sampling schemes and/or other color spaces may be used under techniques as described herein.

Figure 2:
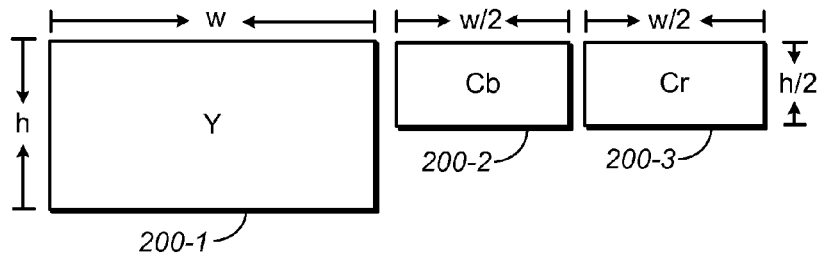
FIG. 2 illustrates an example image container in a sampling scheme associated with a color space.

FIG. 2 illustrates image data portions (200-1 through 200-3) of luminance (Y) and chroma (Cb/Cr) color channels (or components) in an YCbCr color space under a 4-2-0 sampling scheme, in accordance with an example embodiment. In an example, a multi-layer 3D video codec under techniques as described herein supports an 8-bit YCbCr 4:2:0 data format supported by a variety of display application for video compression purposes. As illustrated in FIG. 2, in this image container format, a data portion (either of 200-2 and 200-3) of a chroma channel is a quarter in size of the data portion (200-1) of the luminance channel. In some embodiments, for video compression purposes, BL image data or EL image data are converted by a multi-layer 3D video encoder (e.g., 100 of FIG. 1) into an image container format having the example data portions (200-1 through 200-3) of FIG. 2.

4. EXAMPLE IMAGE DATA COMPOSITIONS 4.1. Complementary Image Data

In an example embodiment, the multi-layer 3D video encoder (100 of FIG. 1A) generates filtered LE image data from an unfiltered full resolution LE image frame (102-L of FIG. 1A), subsamples the filtered LE image data into two halves comprising a first half (e.g., every odd numbered columns or rows) of the subsampled filtered LE image data and a second half (e.g., every even numbered columns or rows) of the complementary subsampled filtered LE image data. Similarly, the multi-layer 3D video encoder (100 of FIG. 1A) generates filtered RE image data from an unfiltered full resolution RE image frame (102-R of FIG. 1A), subsamples the filtered RE image data into two halves comprising a first half (e.g., every odd numbered columns or rows) of subsampled filtered RE image data and a second half (e.g., every even numbered columns or rows) of complementary subsampled filtered RE image data. Subsampling the filtered LE and RE image data may be based on one of one or more different subsampling schemes.

In an example embodiment, image data in the base layer (112-1 of FIG. 1A or 158-1 of FIG. 1B and FIG. 1C) may comprise the first half of the subsampled filtered LE and RE image data.

In an example embodiment, EL image data in the enhancement layers (112-2 of FIG. 1A or 158-2 of FIG. 1C) may carry half resolution image data complementary to the image data (112-1 of FIG. 1A, or 158-1 of FIG. 1B and FIG. 1C) carried in the base layer. The half resolution image data in the EL image data (112-2 of FIG. 1A or 158-2 of FIG. 1C) may comprise the second half of the subsampled filtered LE and RE image data.

Figure 3A:
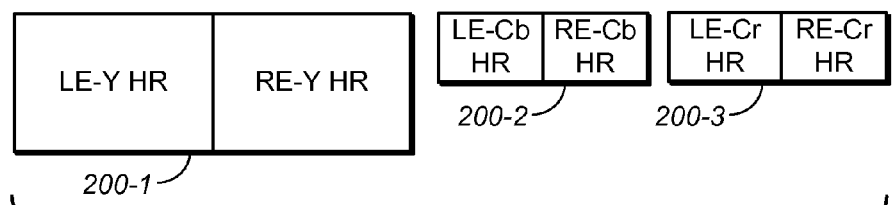
FIG. 3A through FIG. 3E illustrate example types of image data compositions relating to enhancement layer image data.

FIG. 3A illustrates example image data composition of EL image data based on an example image container format illustrated in FIG. 2. In an example embodiment, image data in a luminance channel of the second half of the subsampled filtered LE and RE image data is held in the data portion (200-1) designated for the luminance channel in the YCbCr color space; image data in a Cb chroma channel of the second half of the subsampled filtered LE and RE image data is held in the data portion (200-2) designated for the Cb chroma channel in the YCbCr color space; and image data in a Cr chroma channel of the second half of the subsampled filtered LE and RE image data is held in the data portion (200-3) designated for the Cb chroma channel of the image frame in the YCbCr color space.

For brevity reasons, image data in a luminance channel may be referred to as "luminance image data" or "luminance values," while image data in a chroma channel may be referred to as "chroma image data" or "chroma values." Similarly, image data in the Cb channel may be referred to as "Cb image data" or "Cb values," while image data in the Cr channel may be referred to as "Cr image data" or "Cr values."

Sizes of the image data portions in different color channels may be limited to what specified in an adopted sampling scheme with adjustment (down-sampling, upsampling, or other image data compression or expansion methods) if necessary. In an example, under a 4-4-4 sampling scheme, the luminance image data portion may be the same in size as that of the chroma image data portion. In another example, under a 4-2-0 sampling scheme as illustrated in FIG. 2, the luminance image data portion (200-1) may be 4 times (4×) in size that of a chroma image data portion (either of 200-2 and 200-3).

The placement of the subsampled filtered LE and RE image data in the enhancement layers may be configured differently from what is illustrated in FIG. 3A. For example, instead of placing LE and RE sub-portions as illustrated in FIG. 3A, the LE and RE sub-portions in the luminance image data portion (200-1) may be swapped so that the RE sub-portion is placed on the left half of the data portion (200-1) and the LE sub-portion is placed on the right half of the data portion (200-1). The same discussion also applies to the other data portions (200-2 and 200-3).

A multi-layer 3D video decoder (e.g., 150 of FIG. 1C) may combine half resolution image data portions in the base layer with the complementary half resolution image data (e.g., in data portions 200-1 through 200-3) in the enhancement layers to form full resolution filtered LE and RE image frames. Since high spatial frequency content has been filtered out by an upstream encoding device (e.g., 100 of FIG. 1A), the combined full resolution filtered LE and RE image frames do not have image details corresponding to the high spatial frequency content.

4.2. Unfiltered Full Resolution Image Data for One of the Two Perspectives

In an example embodiment, EL image data (e.g., in data portions 200-1 through 200-3) in the enhancement layers (112-2 of FIG. 1A or 158-2 of FIG. 1C) may carry unfiltered full resolution image data for one of the LE and RE perspective at any given time. Specifically, the unfiltered full resolution image data may comprise image data of one of the unfiltered full resolution LE and RE image frames (102-L or 102-R of FIG. 1A). In an example embodiment, the multi-layer 3D video encoder (100 of FIG. 1A) subsamples unfiltered full resolution image data in compliance with an adopted sampling scheme.

Figure 3B:
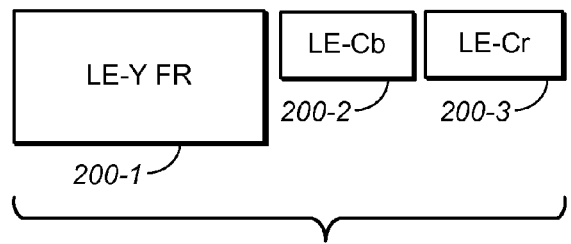

FIG. 3B illustrates example image data composition of EL image data comprising unfiltered full resolution image data for one of the LE and RE perspectives based on an example image container format illustrated in FIG. 2. For the purpose of illustration only, the unfiltered full resolution image data in the example image data composition of FIG. 3B is that of the LE perspective. In an example embodiment, luminance image data of the unfiltered full resolution LE image frame (102-L), subsampled under the adopted sampling scheme if necessary, is held in a data portion (e.g., 200-1) designated for the luminance channel in the YCbCr color space; Cb image data of the unfiltered full resolution LE image frame (102-L), subsampled under the adopted sampling scheme if necessary, is held in a data portion (e.g., 200-2) designated for the Cb chroma channel in the YCbCr color space; and Cr image data of the unfiltered full resolution LE image frame (102-L), subsampled under the adopted sampling scheme if necessary, is held in a data portion (200-3) designated for the Cb chroma channel in the YCbCr color space.

Sizes of the unfiltered image data portions in the different color channels may be limited to what specified in the adopted sampling scheme with adjustment if necessary.

In an example embodiment, the multi-layer 3D video encoder (100 of FIG. 1A) adaptively switches the unfiltered full resolution image data in the enhancement layers between the LE and RE perspectives. Carriage of unfiltered full resolution image data in the enhancement layers may alternate between the LE and RE perspectives from one 3D image to the next 3D image, from one scene to the next scene, from one fixed duration to a next fixed duration. In an example embodiment, the fixed duration may be the playback time of one single frame or multiple frames. In an example embodiment, the length of the duration may change from program to program. Other ways of alternatively carrying unfiltered full resolution image data between the LE and RE perspectives may be used. In other example embodiments, one or more signal characteristics (e.g., fingerprints, statistical luminance values, motions, chroma features, sharpness, brightness, colors, etc.) of input 3D images (or their LE and RE constituent image frames) may be used by a multi-layer 3D video encoder as described herein to decide whether and when such a switching or transition in the enhancement layers between the perspectives occurs.

Intra-layer prediction and/or inter-layer prediction capabilities to fully exploit statistical redundancy among multi-layer image data may be used to reduce bitrate requirements for carriage of unfiltered full resolution image data in the enhancement layers. An RPU (e.g., 114 of FIG. 1A) may upsample a half resolution image data portion—which is derived from an unfiltered full resolution image frame (e.g., 102-L)—in the base layer to generate a prediction reference frame for the unfiltered full resolution image frame (102-L). Residuals (or differences) between the prediction reference frame and the unfiltered full resolution image frame (102-L) may be carried in the enhancement layers along with a set of reference parameters that are used in generating the prediction reference frame.

A multi-layer 3D video decoder (e.g., 150 of FIG. 1C) may upsample the same half resolution image data portion in the base layer using the set of reference parameters received from the multi-layer 3D video encoder (100 of FIG. 1A), generate the prediction reference frame, and further generate an image frame with unfiltered full resolution image data for the first perspective (e.g., the left eye perspective in the present example) by summing image data in the prediction reference frame and the residuals received from the enhancement layers. Additionally, the multi-layer 3D video decoder (150 of FIG. 1C) may generate, based on another half resolution image data portion—which is derived from the other unfiltered full resolution image frame (102-R)—in the base layer, an upsampled image frame comprising only filtered image data for a second different perspective (e.g., the right eye perspective in the present example).

4.3. Resolution-Asymmetric Unfiltered Luminance Image Data

In an example embodiment, at any given time, EL image data in the enhancement layers (112-2 of FIG. 1A or 158-2 of FIG. 1C) may carry unfiltered full resolution luminance image data for a first perspective (e.g., the left eye perspective) and unfiltered half resolution luminance image data for a second different perspective. The unfiltered full resolution luminance image data may comprise luminance image data of an unfiltered full resolution image frame (e.g., 102-L of FIG. 1A) for the first perspective, while the unfiltered half resolution luminance image data may comprise half resolution luminance image data of the other unfiltered full resolution image frame (102-R of FIG. 1A in the present example) for the second perspective. In an example embodiment, the unfiltered half resolution luminance image data for the second perspective and a BL luminance image data portion for the second perspective carry luminance image data for the same portion of pixels in the other unfiltered full resolution image frame (102-R of FIG. 1A in the present example). In an example embodiment, the multi-layer 3D video encoder (100 of FIG. 1A) subsamples the EL image data under an adopted sampling scheme.

Figure 3C:
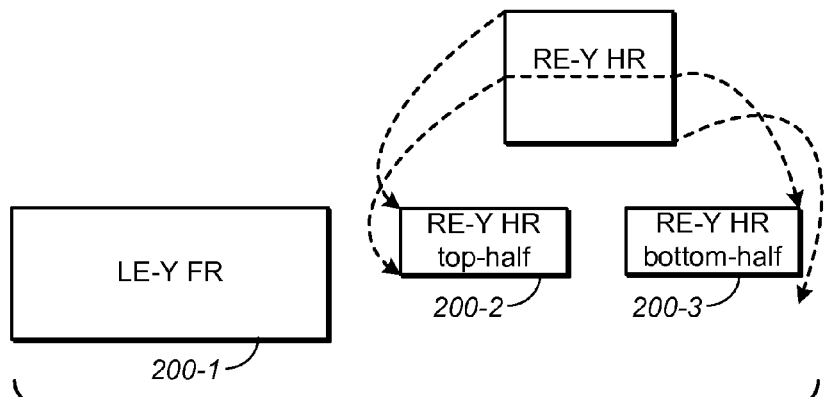

FIG. 3C illustrates example image data composition in EL image data comprising unfiltered full resolution luminance image data for a first perspective and unfiltered half resolution luminance image data for a second different perspective in an YCbCr color space under a (e.g., 4-2-0) sampling scheme. For the purpose of illustration only, the unfiltered full resolution luminance image data in the example image data composition is that of the LE perspective, while the unfiltered half resolution luminance image data in the example image data composition is that of the RE perspective.

In an example embodiment, luminance image data of the unfiltered full resolution LE image frame (102-L), subsampled under the adopted sampling scheme if necessary, is held in a data portion (200-1) designated for the luminance channel in the YCbCr color space. A first part of (e.g., the top half of pixels represented by) the unfiltered half resolution luminance image data, subsampled under the adopted sampling scheme if necessary, is held in a data portion (200-2) designated for the Cb chroma channel in the YCbCr color space. A second part of (e.g., the bottom half of the pixels represented by) the unfiltered half resolution luminance image data, subsampled under the adopted sampling scheme if necessary, is held in a data portion (200-3) designated for the Cb chroma channel in the YCbCr color space.

Sizes of the unfiltered image data portions in the different perspectives may be limited to be consistent with what specified in the adopted sampling scheme with any adjustment if necessary.

In an example embodiment, the multi-layer 3D video encoder (100 of FIG. 1A) adaptively switches the unfiltered full resolution luminance image data, and correspondingly the unfiltered half resolution luminance image data, in the enhancement layers between the LE and RE perspectives. Carriage of unfiltered full resolution image data in the enhancement layers may alternate between the LE and RE perspectives from one 3D image to the next 3D image, from one scene to the next scene, from one program to the next program, from one fixed duration to a next fixed duration. Other ways of alternatively carrying unfiltered full resolution luminance image data between the LE and RE perspectives may also be used.

To transmit unfiltered full resolution luminance image data via the enhancement layers, an RPU (e.g., 114 of FIG. 1A) may upsample a BL half resolution luminance image data portion for a first perspective (e.g., the left eye perspective in the previous example) to generate prediction reference values for the unfiltered full resolution luminance image data in the data portion 200-1. The RPU (114) may upsample a BL half resolution luminance image data portion for a second different perspective (the right eye perspective) to generate additional prediction reference values for the unfiltered half resolution luminance image data in the data portions 200-2 and 200-3. One or more operations may be applied to improve the inter-layer prediction quality of these prediction reference values.

Luminance residuals (or differences) between the prediction reference values and full resolution luminance image data in the unfiltered image frames for the first perspective (102-L) may be computed. The luminance residuals are stored in the data portion 200-1. Additional luminance residuals (or differences) between the additional prediction reference values and half resolution luminance image data in the other unfiltered image frames for the second perspective (102-R) may also be computed. The additional luminance residuals are stored in the data portions 200-2 and 200-3.

The luminance residuals in all the data portions 200-1 through 200-3 are then carried in the enhancement layers along with a set of reference parameters that are used in generating the prediction reference values and the additional prediction reference values.

A multi-layer 3D video decoder (e.g., 150 of FIG. 1C) may receive and upsample the half resolution luminance image data portion in the base layer for the first perspective using the set of reference parameters, generates the prediction reference values, and further generates unfiltered full resolution luminance image data in an output image frame for the first perspective by summing the prediction reference values and the luminance residuals (in the data portion 200-1) received from the enhancement layers.

The multi-layer 3D video decoder (150 of FIG. 1C) may receive and upsample the half resolution luminance image data portion in the base layer for the second perspective using the set of reference parameters, generates the additional prediction reference values, and further generates half resolution luminance image data in another output image frame for the second perspective by summing the additional prediction reference values and the additional luminance residuals (in the data portions 200-2 and 200-3) received from the enhancement layers.

In an example embodiment, the one or more enhancement layers carry only luminance image data and do not carry any chroma image data. To generate a 3D image with at least a portion of unfiltered full resolution (e.g., luminance) image data, chroma image data in the base layer may be upsampled and interpolated with luminance image data as necessary by a downstream device (e.g., a multi-layer vide decoder 150 of FIG. 1C) to form the output LE and RE image frames for the 3D image.

4.4. Selected Portions of Unfiltered Full Resolution Image Data

In some embodiments, one or more enhancement layers may comprise selected portions of unfiltered full resolution image data in both unfiltered full resolution LE and RE image frames (e.g., 102-L and 102-R of FIG. 1A). As used herein, "a selected portion" may refer to any portion less than 100% of the total number of pixels in an image frame. A selected portion as described herein may comprise one of 0-100%, 10-90%, 20-80, 30-70%, 40-60%, 50%, or other percentile ranges of the total number of pixels in an image frame.

In an example embodiment, the same sampling scheme applies to both (a) the unfiltered full resolution LE and RE image frames (e.g., 102-L and 102-R of FIG. 1A); and (b) EL image data comprising selected portions of the unfiltered full resolution LE and RE image frames; neither low-pass filtering nor subsampling may be necessary for holding the selected portions of the unfiltered full resolution LE and RE image frames (102-L and 102-R of FIG. 1A) in the enhancement layers.

Frequently, only a salient portion of a 3D image would manifest significant noticeable differences between a low-pass-filtered version (e.g., 172-L and 172-R of FIG. 1B) of the 3D image and an unfiltered full resolution version (e.g., 102-L and 102-R of FIG. 1A) of the 3D image. This observation may be made with a wide variety of 3D content. In some embodiments, it is sensible to send only visually salient areas (e.g., a central rectangular portion of a 3D image, a central elliptical portion of a 3D image, or another visually salient portion of a 3D image) when carriage of both unfiltered full resolution LE and RE data in full size is not available or supportable.

Figure 3D:
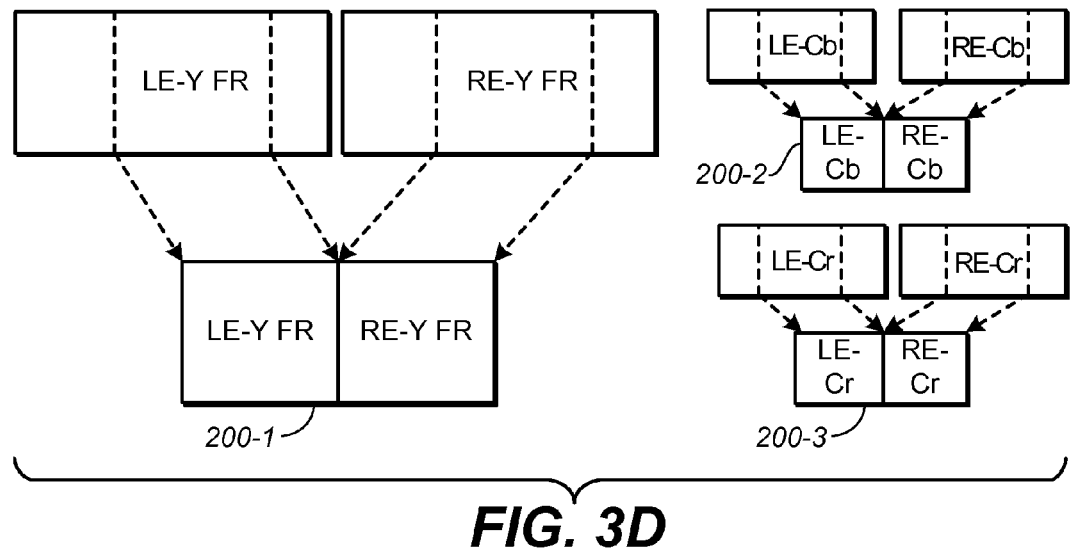

FIG. 3D illustrates example image data composition in EL image data that stores selected portions of unfiltered full resolution image data in unfiltered full resolution LE and RE image frames (e.g., 102-L and 102-R of FIG. 1A).

In an example embodiment, luminance image data of the selected portions of the unfiltered full resolution LE and RE image frames (102-L or 102-R), subsampled under the adopted sampling scheme if necessary, is held in a data portion (200-1) designated for the luminance channel of an image frame in the YCbCr color space. Cb image data of the selected portions of the unfiltered full resolution LE and RE image frames (102-L or 102-R), subsampled under the adopted sampling scheme if necessary, is held in a data portion (200-2) designated for the Cb color channel of the image frame in the YCbCr color space. Cr image data of the selected portions of the unfiltered full resolution LE and RE image frames (102-L or 102-R), subsampled under the adopted sampling scheme if necessary, is held in a data portion (200-3) designated for the Cr color channel of the image frame in the YCbCr color space.

Sizes of the unfiltered and filtered image data portions in the different perspectives may be adjusted, if necessary, to be consistent with what specified in the adopted sampling scheme.

Geometric information including but not limited to information indicating the positions of the selected portions may be transmitted, for example, through one or more video signal in an RPU stream (118-2 of FIG. 1A or FIG. 1C).

To transmit unfiltered full resolution image data for selected portions of unfiltered full resolution LE and RE image frames (102-L and 102-R) via the enhancement layers, an RPU (e.g., 114 of FIG. 1A) may upsample selected portions of BL half resolution image data portion to generate prediction reference values for the selected portions of unfiltered full resolution LE and RE image frames (102-L and 102-R). One or more operations may be applied to improve the inter-layer prediction quality of these prediction reference values.

Residuals (or differences) between the prediction reference values and full resolution luminance image data in the selected portions of unfiltered full resolution LE and RE image frames (102-L and 102-R) may be computed. The residuals are then placed in the data portions 200-1 through 200-3.

The residuals in the data portions 200-1 through 200-3 are transmitted to a recipient device in the enhancement layers along with a set of reference parameters that are used in generating the prediction reference values.

In an example embodiment, a multi-layer 3D video decoder (e.g., 150 of FIG. 1C) receives and upsamples image data portion in the base layer to form upsampled LE and RE image frames. The multi-layer 3D video decoder (150 of FIG. 1C) computes prediction reference values using selected portions of upsampled LE and RE image frames using the set of reference parameters, and further generates/replaces selected portions of output LE and RE image frames (e.g., 176-L and 176-R of FIG. 1C) by summing the prediction reference values and the residuals (in the data portions 200-1 through 200-3) received from the enhancement layers.

4.5. Selected Portion of Unfiltered Full Resolution Luminance Image Data for One of the Perspectives In an example embodiment, at any given time, EL image data in the enhancement layers (112-2 of FIG. 1A or 158-2 of FIG. 1C) may provide unfiltered full resolution luminance image data for a first perspective (e.g., the left eye perspective) and a selected portion of unfiltered full resolution luminance image data for a second different perspective. The unfiltered full resolution luminance image data for the first perspective may comprise luminance image data of an unfiltered full resolution image frame (e.g., 102-L of FIG. 1A) for the first perspective, while the selected portion of unfiltered full resolution luminance image data for the second perspective may comprise luminance image data of a selected portion of the other unfiltered full resolution image frame (102-R of FIG. 1A in the present example) for the second perspective.

Figure 3E:
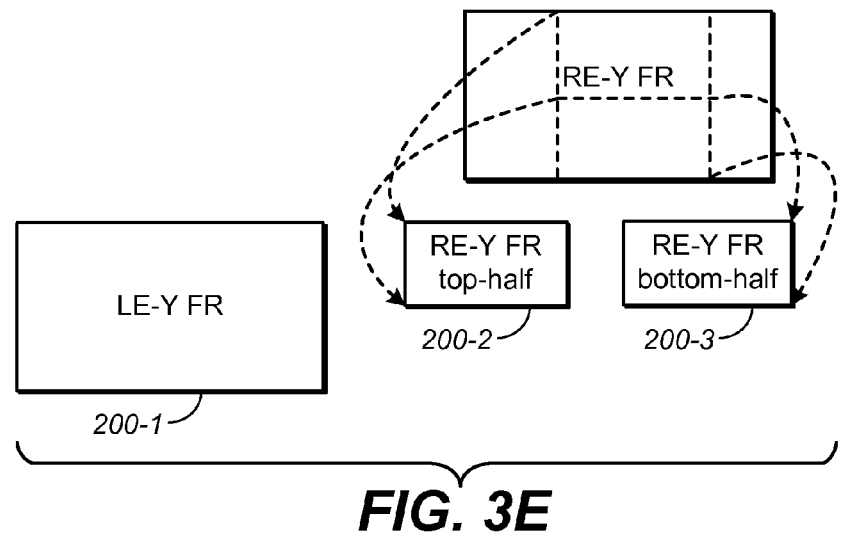

FIG. 3E illustrates example image data composition in EL image data comprising unfiltered full resolution luminance image data for a first perspective (e.g., the left eye perspective) and a selected portion of unfiltered full resolution luminance image data for a second different perspective (e.g., the right eye perspective).

In an example embodiment, luminance image data of the unfiltered full resolution LE image frame (102-L), subsampled under the adopted sampling scheme if necessary, is held in a data portion (200-1) designated for the luminance channel of an image frame in the YCbCr color space. Under some sampling schemes, the remaining data portions are less than the data portion (200-1). For example, in a 4-2-0 sampling scheme, the remaining data portions in total may amount to one half of the data portion (200-1). Thus, the remaining data portions may not have sufficient data capacity to carry luminance image data for the second perspective. Instead, a first part of (e.g., the top half of pixels represented by) the selected portion (e.g., 50%) of unfiltered full resolution luminance image data for the second perspective, subsampled under the adopted sampling scheme if necessary, is held in a data portion (200-2) designated for the Cb chroma channel of the image frame in the YCbCr color space. A second part of (e.g., the bottom half of the pixels represented by) the selected portion of unfiltered full resolution luminance image data for the second perspective, subsampled under the adopted sampling scheme if necessary, is held in a data portion (200-3) designated for the Cb chroma channel of the image frame in the YCbCr color space.

Sizes of the unfiltered image data portions in the different perspectives may be limited to be consistent with what specified in the adopted sampling scheme with any adjustment if necessary.

In an example embodiment, the multi-layer 3D video encoder (100 of FIG. 1A) switches unfiltered full resolution luminance image data, and correspondingly a selected portion of unfiltered full resolution luminance image data in the enhancement layers between the LE and RE perspectives. Carriage of unfiltered full resolution image data in the enhancement layers may alternate between the LE and RE perspectives from one 3D image to the next 3D image, from one scene to the next scene, from one fixed duration to a next fixed duration. Other ways of alternatively carrying unfiltered full resolution image data between the LE and RE perspectives may also be used.

To transmit unfiltered full resolution luminance image data via the enhancement layers, an RPU (e.g., 114 of FIG. 1A) may upsample BL half resolution luminance image data for a first perspective (e.g., the left eye perspective in the previous example) to generate prediction reference values for the unfiltered full resolution image data in the data portion 200-1. The RPU (114) may upsample a selected portion of BL half resolution luminance image data for a second different perspective (the right eye perspective) to generate additional prediction reference values for the unfiltered full resolution image data in the data portions 200-2 and 200-3. One or more operations may be applied to improve the inter-layer prediction quality of these prediction reference values.

Luminance residuals (or differences) between the prediction reference values and full resolution luminance image data in the unfiltered image frames for the first perspective (102-L) may be computed. The luminance residuals are stored in the data portion 200-1. Additional luminance residuals (or differences) between the additional prediction reference values and the selected portion of unfiltered full resolution luminance image data for the second perspective (102-R) may also be computed. The additional luminance residuals are stored in the data portions 200-2 and 200-3.

The luminance residuals in the data portions 200-1 through 200-3 are outputted in the enhancement layers along with a set of reference parameters that are used in generating the prediction reference values and the additional prediction reference values. Geometric information including but not limited to information indicating the positions of the selected portion may be transmitted through one or more video signal in an RPU stream (118-2 of FIG. 1A or FIG. 1C).

A multi-layer 3D video decoder (e.g., 150 of FIG. 1C) may receive and upsample the half resolution luminance image data portion in the base layer for the first perspective using the set of reference parameters, generates the prediction reference values, and further generates unfiltered full resolution luminance image data in an output image frame for the first perspective by summing the prediction reference values and the luminance residuals (in the data portion 200-1) received from the enhancement layers.

In an example embodiment, the multi-layer 3D video decoder (150 of FIG. 1C) receives and upsamples half resolution luminance image data portion in the base layer to form upsampled image frame for the second perspective. The multi-layer 3D video decoder (150 of FIG. 1C) computes prediction reference values using a selected portion of the upsampled image frame using the set of reference parameters, and further generates/replaces a selected portion of output image frame (e.g., 176-R of FIG. 1C) by summing the prediction reference values and the residuals (in the data portions 200-1 through 200-3) received from the enhancement layers.

In an example embodiment, chroma image data in the base layer may be upsampled and interpolated with luminance image data by a downstream device (e.g., a multi-layer vide decoder 150 of FIG. 1C) as a part of forming the output LE and RE image frames for the 3D image.

4.6. Fallback or Alternative Image Data Composition

For the purpose of illustration, it has been described that some example EL data compositions include both luminance image data and non-luminance image data, or include both luminance image data for one perspective and partial luminance image data for the other perspective. As fallbacks, these example EL data composition may be configured, for example dynamically based on the present network condition, to carry less image data. In some embodiments, only luminance image data is transmitted to a recipient device for one or both perspectives. For example, data portions 200-2 and 200-3 of FIG. 2 may carry only a flat image with stub values, which may be pel (or fallback) values each being set to 128 in the case of 8-bit image data.

Figure 4:
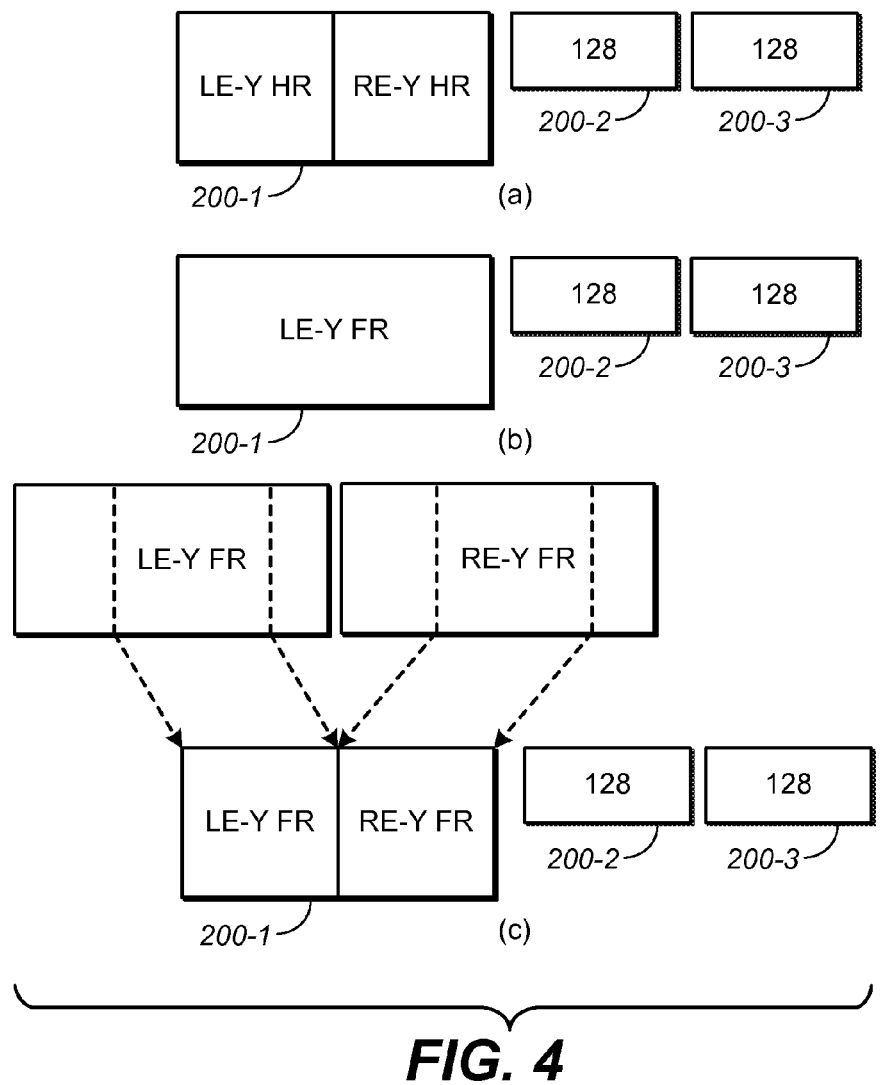
FIG. 4 illustrates some example fallback data compositions relating to enhancement layer image data.

FIG. 4 illustrates some example fallback data compositions. In an example as illustrated in FIG. 4(a), the data portion 200-1 may be used to convey filtered half resolution luminance image data for both LE and RE perspectives, the same as illustrated in FIG. 3A; however, the data portions 200-2 and 200-3 of FIG. 4 now contain only pel values (e.g., 128), instead of Cb/Cr image data. In another example as illustrated in FIG. 4(b), the data portion 200-1 may carry unfiltered full resolution luminance image data for a first perspective, the same as illustrated in FIG. 3B, FIG. 3C and FIG. 3E; however, the data portions 200-2 and 200-3 of FIG. 4 contain only pel values (e.g., 128), instead of Cb/Cr image data or other luminance image data. In a further example as illustrated in FIG. 4(c), the data portion 200-1 may be used to convey selected portions of unfiltered full resolution luminance image data for both LE and RE perspectives, the same as illustrated in FIG. 3D; however, the data portions 200-2 and 200-3 of FIG. 4 contain only pel values (e.g., 128), instead of Cb/Cr image data.

Using pel values in these example EL data compositions consumes a negligible number of bits in the video compression.

For the purpose of illustration only, a number of fallback and non-fallback data compositions for EL image data have been illustrated. Other types of data compositions may be used within the scope of the present invention. Further, a combination of the foregoing data compositions may be used to carry image data in one or more enhancement layers. In an example embodiment, data portion 200-1 may be used to carry EL luminance data as illustrated in FIG. 3D, while data portions 200-2 and 200-3 may be used to carry a portion of the remaining pixels of unfiltered full resolution LE and RE luminance image data.

In an example embodiment, the luminance channel of an image frame (112-2 of FIG. 1A or 158-2 of FIG. 1C) is used to convey a subset of unfiltered luminance image data in the original unfiltered full resolution input LE and RE image frames (e.g., 102-L and 102-R of FIG. 1A) through one or more enhancement layers, while the chroma channels of the image frame (112-2 of FIG. 1A or 158-2 of FIG. 1C) are used to carry (a) a subset of the remaining luminance data of the original unfiltered full resolution input LE and RE image frames (102-L and 102-R of FIG. 1A), (b) a subset of complementary filtered image data (112-1 of FIG. 1A or 158-1 of FIG. 1C) derived from the original unfiltered full resolution input LE and RE image frames (102-L and 102-R of FIG. 1A), or (c) a subset of unfiltered chroma data in the original unfiltered full resolution input LE and RE image frames (102-L and 102-R of FIG. 1A).

In an example embodiment, a multi-layer 3D video decoder (e.g., 150 of FIG. 1C) may be configured to handle EL image data with pel values in one or more data portions. For example, a data portion (e.g., one of 200-1 through 200-3) may be varyingly, partially or entirely populated with pel values to adjust the delivery of 3D image data with underlying network conditions. The multi-layer 3D video decoder (150 of FIG. 1C) may upsample and/or interpolate missing image data that has been replaced by the pel values as a part of generating output LE and RE image frames.

These example data compositions may be used when and where the enhancement layers are allocated with a limited bandwidth. Under techniques as described herein, luminance image data is prioritized relative to other image data in the enhancement layers to a maximal extent, as the quality of the output 3D images depends more on luminance image data than chroma image data, especially when the available bandwidth is low and when the bitrate requirement to produce quality 3D images is high.

In some embodiments, an upstream device (which may comprise a multi-layer 3D video encoder such as 100 of FIG. 1A) may support a plurality of different types of data compositions and may transmit EL image data in any of the plurality of different types of data compositions. The different types of data compositions may include, but are not limited only to, the example data compositions as illustrated in FIG. 3 and FIG. 4. In an example embodiment, the upstream device may be preconfigured, dynamically configured during runtime, or manually configured by a user, to use one or more data compositions for a frame, multiple frames, a scene, multiple scenes, a second, multiple seconds, a program, multiple programs, etc. Additionally and/or optionally, other ways of alternating carriage of EL image data among different types of data compositions may be used. For example, one or more signal characteristics (e.g., fingerprints, statistical luminance values, motions, chroma features, sharpness, brightness, colors, etc.) of input 3D images (or their LE and RE constituent image frames) may be used by a multi-layer 3D video encoder as described herein to decide whether and when a particular type of data composition should be used to transmit EL image data.

In some embodiments, a downstream device (which may comprise a multi-layer 3D video decoder such as 150 of FIG. 1C) may support one or more different types of data compositions and may receive EL image data in any of the one or more different types of data compositions. In an example embodiment, the downstream device may be preconfigured, dynamically configured during runtime, or manually configured by a user, to selectively receive video signals in the one or more different types of data compositions.

In some embodiments, an upstream device may transmit EL image data in one or more specific types of data compositions based on the current network condition and/or characteristics of recipient devices. In some embodiments, a downstream device may select one or more video signals with EL image data in one or more specific types of data compositions based on the current network condition and/or availability of different types of data compositions of the same media content. In some embodiments, an image processing device as described herein is configured to operate with one or more different types of data compositions that provide the best possible stereo 3D viewing experience.

Additionally and/or optionally, one or more of transform, quantization, entropy coding, image buffering, sample filtering, down-sampling, upsampling, interpolation, multiplexing, demultiplexing, interleaving, upscaling, downscaling, motion-compensating, disparity estimation, disparity compensation, depth estimation, depth compensation, encoding, decoding, etc., may be performed by a video encoder or decoder as described herein.

Techniques as described herein produce better spatial resolution in perceived stereoscopic 3D. In some example embodiments, one or more of a backward compatibility with a decoder that is only capable of decoding BL 3D images and a backward compatibility with a decoder that is capable of decoding filtered complementary EL 3D image data are maintained. Thus, in some example embodiments, video signals as described herein may be backward compatible to existing frame-compatible systems for 3D content delivery and may be used with the current FCFR framework. In addition, techniques as described herein provide flexibility of alternating among different types of image data compositions in the enhancement layers for creating the best reproduction of 3D visual quality.

5. EXAMPLE PROCESS FLOWS

Figure 5A:
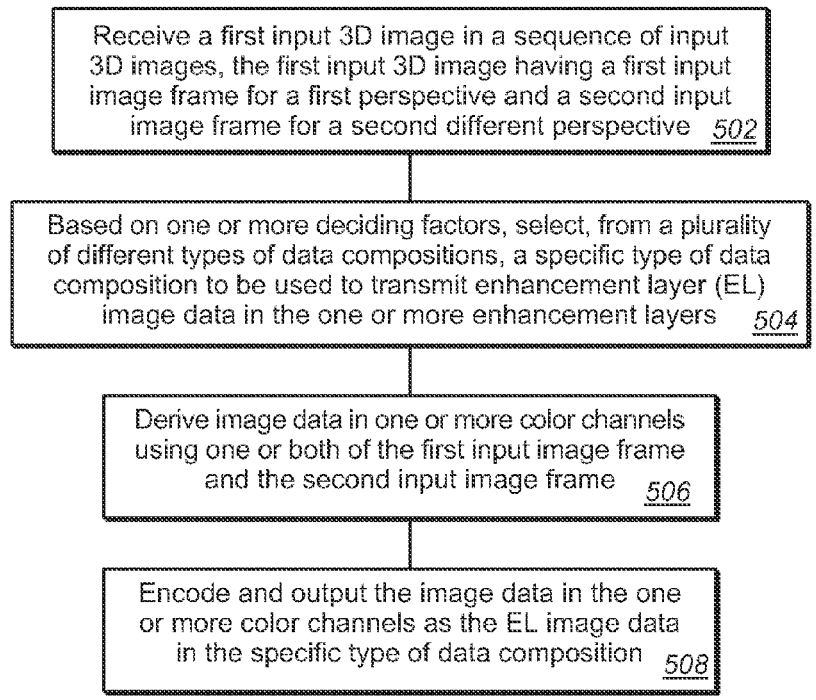
FIG. 5A and FIG. 5B illustrate example process flows, according to example embodiments of the present invention.

FIG. 5A illustrates an example process flow according to an example embodiment of the present invention. In some example embodiments, one or more computing devices or components may perform this process flow. In block 502, a multi-layer 3D video encoder (e.g., 100 of FIG. 1A) receives a first input 3D image in a sequence of input 3D images. The first input 3D image has a first input image frame for a first perspective and a second input image frame for a second different perspective.

In block 504, the multi-layer 3D video encoder (100) selects, based on one or more deciding factors, from a plurality of different types of data compositions, a specific type of data composition to be used to transmit enhancement layer (EL) image data in the one or more enhancement layers.

In block 506, the multi-layer 3D video encoder (100) derives image data in one or more color channels using one or more of the first input image frame and the second input image frame.

In block 508, the multi-layer 3D video encoder (100) encodes and outputs the image data in the one or more color channels as the EL image data in the specific type of data composition.

In an example embodiment, the multi-layer 3D video encoder (100) generates, based on the first input image frame and the second input image frame, reduced resolution image data for the first perspective and the second perspective; and encodes and outputs the reduced resolution image data in a base layer. In an example embodiment, the image data in the one or more color channels comprises unfiltered high spatial frequency content derived from the one or more of the first and second input image frames, while the reduced resolution image data comprises filtered image data derived from the first and second input image frames.

In an example embodiment, the multi-layer 3D video encoder (100) generates, based at least in part on the reduced resolution image data and a set of reference parameters, a plurality of prediction reference values; computes the image data in the one or more color channels as a plurality of residual values between the plurality of prediction reference values and a plurality of pixel values in the one or more color channels in at least one of the first and second input image frames; and encodes and outputs the set of reference parameters with the image data in the one or more color channels.

In an example embodiment, the sequence of input 3D images comprises a second different input 3D image having a third input image frame for the first perspective and a fourth input image frame for the second perspective. The multi-layer 3D video encoder (100) selects, based on the one or more deciding factors, from the plurality of different types of data compositions, a second specific type of data composition to be used to transmit second EL image data in the one or more enhancement layers; derives one second image data in one or more second color channels from one or more of the third input image frame and the fourth input image frame; encodes and outputs the second image data in the one or more second color channels as the second EL image data in the second specific type of data composition. In an example embodiment, a first EL image data descriptor that indicates the specific type of data composition for the EL image data is outputted in the enhancement layers with the EL image data, whereas a second different EL image data descriptor that indicates the second specific type of data composition for the second EL image data is outputted in the enhancement layers with the second image data. In an example embodiment, a sequence of EL image data descriptors is outputted in the enhancement layers with image data derived from the sequence of input 3D images. The first EL image data descriptor immediately precedes the second EL image data descriptor in the sequence of EL image data descriptors; and the first EL image data descriptor transitions to the second EL image data descriptor in the sequence of EL image data descriptors at one of a frame level, a scene level, or a fixed duration level.

In an example embodiment, the one or more color channels comprise at least one color channel in one of an RGB color space, an YCbCr color space, or other color spaces.

In an example embodiment, an image container is used to hold the image data in the one or more color channels; the image container comprises two or more data portions sampled under a sampling scheme; and the image container is selected from a plurality of image containers associated with a plurality of sampling schemes. In some embodiments, the plurality of sampling schemes comprises at least a 4-4-4 sampling scheme, a 4-2-2 sampling scheme, a 4-2-0 sampling scheme, or other sampling schemes.

In some embodiments, the plurality of different types of data compositions comprises one or more of (a) complementary filtered reduced resolution image data that complements filtered reduced resolution image data transmitted through a base layer, (b) unfiltered full resolution image data for one of the first and second perspectives, (c) complete unfiltered full resolution luminance image data for the first perspective and half resolution luminance image data for the second perspective, (d) unfiltered full resolution luminance image data derived from selected portions of the first and second input image frames, (e) complete unfiltered full resolution luminance image data for the first perspective and partial unfiltered full resolution luminance image data for the second perspective, and (d) one or more fallback types of data compositions by replacing at least a portion of image data with pel values.

In an example embodiment, the one or more deciding factors comprise one or more of audio and video signal characteristics, respective bandwidth requirements of the plurality of different types of data compositions, a bandwidth constraint on a current network connection between an upstream device and a recipient device, a maximal, average, or minimal bitrate supported by the current network connection, and/or one or more quality-of service measures of the current network connection.

In an example embodiment, the multi-layer 3D video encoder (100) converts one or more input 3D images represented, received, transmitted, or stored with one or more input video signals into one or more output 3D images represented, received, transmitted, or stored with one or more output video signals.

In some embodiments, at least one of the first input 3D image and the EL image data comprises image data encoded in one of a high dynamic range (HDR) image format, a RGB color spaces associated with the Academy Color Encoding Specification (ACES) standard of the Academy of Motion Picture Arts and Sciences (AMPAS), a P3 color space standard of the Digital Cinema Initiative, a Reference Input Medium Metric/Reference Output Medium Metric (RIMM/ROMM) standard, an sRGB color space, or a RGB color space associated with the BT.709 Recommendation standard of the International Telecommunications Union (ITU).

Figure 5B:
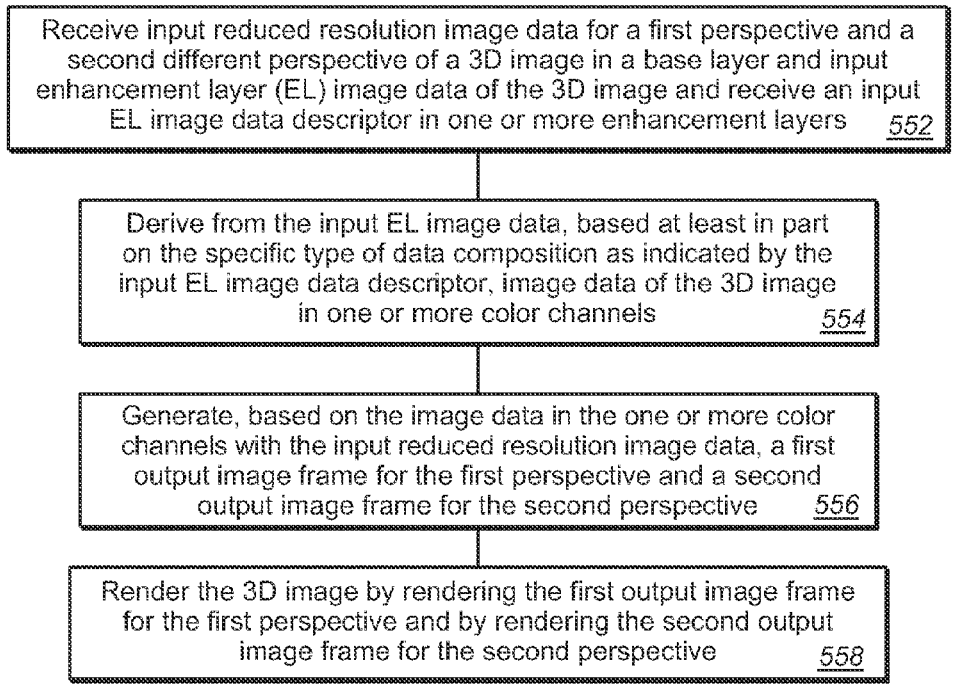

FIG. 5B illustrates an example process flow according to an example embodiment of the present invention. In some example embodiments, one or more computing devices or components may perform this process flow. In block 552, a multi-layer 3D video decoder (e.g., 150 of FIG. 1C) receives input reduced resolution image data for a first perspective and a second different perspective of a 3D image in a base layer and input enhancement layer (EL) image data of the 3D image; and receives an input EL image data descriptor in one or more enhancement layers. The input EL image data descriptor indicates a specific type of data composition for the input EL image data in one or more enhancement layers.

In block 554, the multi-layer 3D video decoder (150) derives from the input EL image data, based at least in part on the specific type of data composition as indicated by the input EL image data descriptor, image data of the 3D image in one or more color channels.

In block 556, the multi-layer 3D video decoder (150) generates, based on the image data in the one or more color channels with the input reduced resolution image data, a first output image frame for the first perspective and a second output image frame for the second perspective.

In block 558, the multi-layer 3D video decoder (150) renders the 3D image by rendering the first output image frame for the first perspective and by rendering the second output image frame for the second perspective.

In an embodiment, the image data in the one or more color channels comprises unfiltered high spatial frequency content in the one or more color channels derived from unfiltered full resolution source image data, whereas the input reduced resolution image data comprises filtered image data derived from the unfiltered full resolution source image data.

In an example embodiment, the multi-layer 3D video decoder (150) receives a set of input reference parameters in the one or more enhancement layers; generates, based at least in part on the input reduced resolution image data and the set of input reference parameters, a plurality of prediction reference values; and combines residual values in the image data in the one or more color channels and the plurality of prediction reference values into a plurality of pixel values in the one or more color channels in at least one of the first and second output image frames.

In an example embodiment, the 3D image is in a sequence of 3D images whose image data is received from both the base layer and the one or more enhancement layers; the sequence of 3D images comprises a second different 3D image; and the multi-layer 3D video decoder (150) is further configured to perform: receiving second input reduced resolution image data for the first perspective and the second perspective of the second 3D image in the base layer and second input EL image data of the second 3D image and a second input EL image data descriptor in the one or more enhancement layers, the second EL image data descriptor indicating a second specific type of data composition for the second EL image data in the one or more enhancement layers; deriving from the second EL image data, based at least in part on the second specific type of data composition as indicated by the second EL image data descriptor, second image data of the second 3D image in one or more second color channels; generating, based on the second image data in the one or more second color channels with the second input reduced resolution image data, a third output image frame for the first perspective and a fourth output image frame for the second perspective; and rendering the second 3D image by rendering the third output image frame for the first perspective and by rendering the fourth output image frame for the second perspective.

In an example embodiment, a sequence of input EL image data descriptors is inputted in the enhancement layers with image data for the sequence of 3D images; the first input EL image data descriptor immediately precedes the second input EL image data descriptor in the sequence of input EL image data descriptors; and the first input EL image data descriptor transitions to the input second EL image data descriptor in the sequence of EL image data descriptors at one of a frame level, a scene level, or a fixed duration level.

In an example embodiment, the one or more color channels comprise at least one color channel in one of an RGB color space, an YCbCr color space, or other color spaces.

In an example embodiment, an image container is used to hold the image data in the one or more color channels; the image container comprises two or more data portions sampled under a sampling scheme; the image container is among a plurality of image containers associated with a plurality of sampling schemes; and the plurality of sampling schemes comprises at least a 4-4-4 sampling scheme, a 4-2-2 sampling scheme, a 4-2-0 sampling scheme, or other sampling schemes.

In an example embodiment, the plurality of different types of data compositions comprises one or more of (a) complementary filtered reduced resolution image data that complements filtered reduced resolution image data transmitted through a base layer, (b) unfiltered full resolution image data for one of the first and second perspectives, (c) complete unfiltered full resolution luminance image data for the first perspective and half resolution luminance image data for the second perspective, (d) unfiltered full resolution luminance image data derived from selected portions of the first and second input image frames, (e) complete unfiltered full resolution luminance image data for the first perspective and partial unfiltered full resolution luminance image data for the second perspective, and (d) one or more fallback types of data compositions by replacing at least a portion of image data with pel values.

In an example embodiment, the multi-layer 3D video decoder (150) processes one or more 3D images represented, received, transmitted, or stored with one or more input video signals.

In an example embodiment, at least a portion of the input reduced resolution image data or the input EL image data comprises image data encoded in one of a high dynamic range (HDR) image format, a RGB color spaces associated with the Academy Color Encoding Specification (ACES) standard of the Academy of Motion Picture Arts and Sciences (AMPAS), a P3 color space standard of the Digital Cinema Initiative, a Reference Input Medium Metric/Reference Output Medium Metric (RIMM/ROMM) standard, an sRGB color space, or a RGB color space associated with the BT.709 Recommendation standard of the International Telecommunications Union (ITU).

In various example embodiments, an encoder, a decoder, a system, an apparatus, or one or more other computing devices performs any or a part of the foregoing methods as described.

6. IMPLEMENTATION MECHANISMS

Hardware Overview

According to one embodiment, the techniques described herein are implemented by one or more special-purpose computing devices. The special-purpose computing devices may be hard-wired to perform the techniques, or may include digital electronic devices such as one or more application-specific integrated circuits (ASICs) or field programmable gate arrays (FPGAs) that are persistently programmed to perform the techniques, or may include one or more general purpose hardware processors programmed to perform the techniques pursuant to program instructions in firmware, memory, other storage, or a combination. Such special-purpose computing devices may also combine custom hard-wired logic, ASICs, or FPGAs with custom programming to accomplish the techniques. The special-purpose computing devices may be desktop computer systems, portable computer systems, handheld devices, networking devices or any other device that incorporates hard-wired and/or program logic to implement the techniques.

Figure 6:
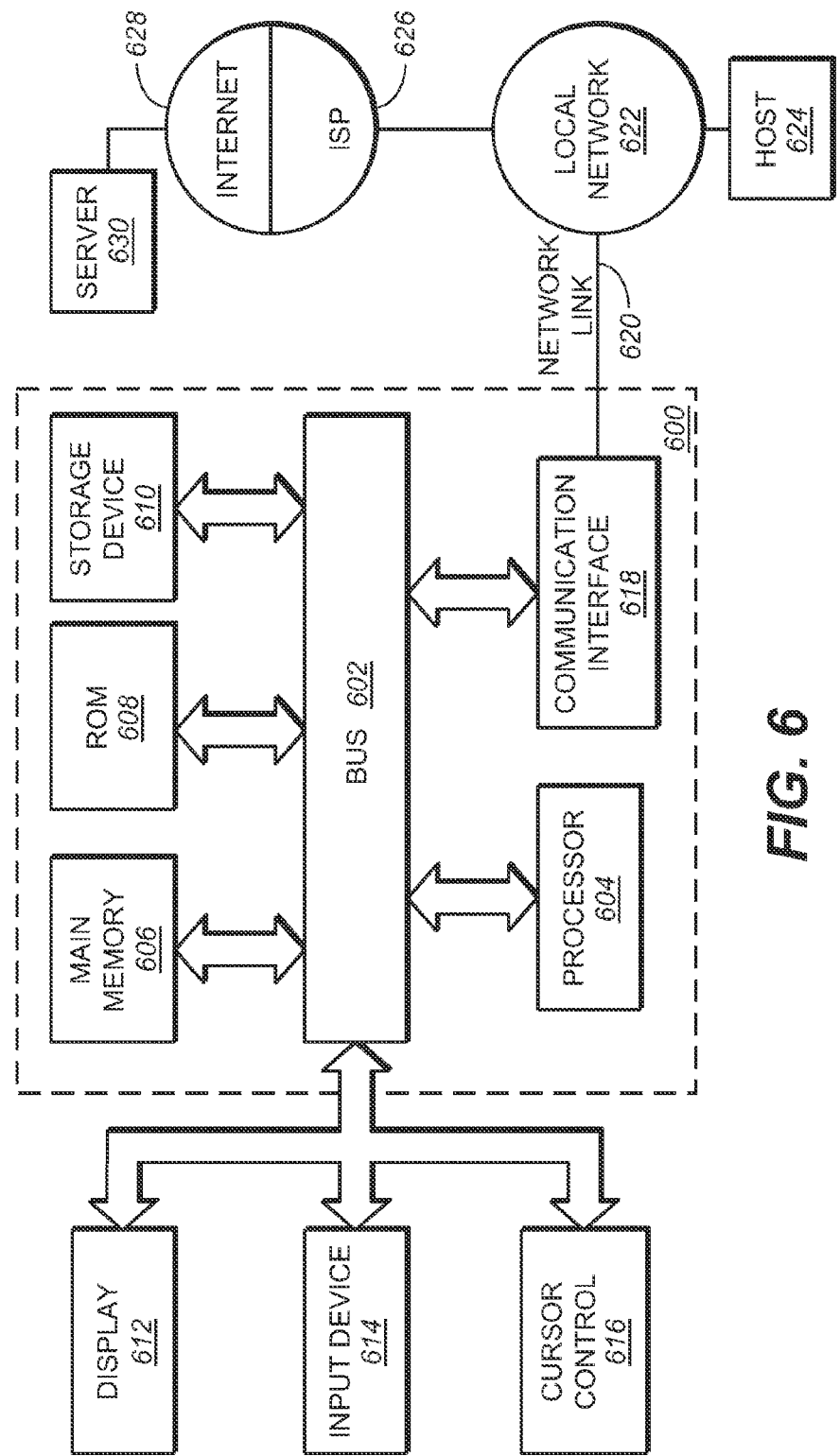
FIG. 6 illustrates an example hardware platform on which a computer or a computing device as described herein may be implemented, according an embodiment of the present invention.

For example, FIG. 6 is a block diagram that illustrates a computer system 600 upon which an example embodiment of the invention may be implemented. Computer system 600 includes a bus 602 or other communication mechanism for communicating information, and a hardware processor 604 coupled with bus 602 for processing information. Hardware processor 704 may be, for example, a general purpose microprocessor.

Computer system 600 also includes a main memory 606, such as a random access memory (RAM) or other dynamic storage device, coupled to bus 602 for storing information and instructions to be executed by processor 604. Main memory 606 also may be used for storing temporary variables or other intermediate information during execution of instructions to be executed by processor 604. Such instructions, when stored in non-transitory storage media accessible to processor 604, render computer system 600 into a special-purpose machine that is customized to perform the operations specified in the instructions.

Computer system 600 further includes a read only memory (ROM) 608 or other static storage device coupled to bus 602 for storing static information and instructions for processor 604. A storage device 610, such as a magnetic disk or optical disk, is provided and coupled to bus 602 for storing information and instructions.

Computer system 600 may be coupled via bus 602 to a display 612, such as a liquid crystal display, for displaying information to a computer user. An input device 614, including alphanumeric and other keys, is coupled to bus 602 for communicating information and command selections to processor 604. Another type of user input device is cursor control 616, such as a mouse, a trackball, or cursor direction keys for communicating direction information and command selections to processor 604 and for controlling cursor movement on display 612. This input device typically has two degrees of freedom in two axes, a first axis (e.g., x) and a second axis (e.g., y), that allows the device to specify positions in a plane.

Computer system 600 may implement the techniques described herein using customized hard-wired logic, one or more ASICs or FPGAs, firmware and/or program logic which in combination with the computer system causes or programs computer system 600 to be a special-purpose machine. According to one embodiment, the techniques herein are performed by computer system 600 in response to processor 604 executing one or more sequences of one or more instructions contained in main memory 606. Such instructions may be read into main memory 606 from another storage medium, such as storage device 610. Execution of the sequences of instructions contained in main memory 606 causes processor 604 to perform the process steps described herein. In alternative embodiments, hard-wired circuitry may be used in place of or in combination with software instructions.

The term "storage media" as used herein refers to any non-transitory media that store data and/or instructions that cause a machine to operation in a specific fashion. Such storage media may comprise non-volatile media and/or volatile media. Non-volatile media includes, for example, optical or magnetic disks, such as storage device 610. Volatile media includes dynamic memory, such as main memory 606. Common forms of storage media include, for example, a floppy disk, a flexible disk, hard disk, solid state drive, magnetic tape, or any other magnetic data storage medium, a CD-ROM, any other optical data storage medium, any physical medium with patterns of holes, a RAM, a PROM, and EPROM, a FLASH-EPROM, NVRAM, any other memory chip or cartridge.

Storage media is distinct from but may be used in conjunction with transmission media. Transmission media participates in transferring information between storage media. For example, transmission media includes coaxial cables, copper wire and fiber optics, including the wires that comprise bus 602. Transmission media can also take the form of acoustic or light waves, such as those generated during radio-wave and infra-red data communications.

Various forms of media may be involved in carrying one or more sequences of one or more instructions to processor 604 for execution. For example, the instructions may initially be carried on a magnetic disk or solid state drive of a remote computer. The remote computer can load the instructions into its dynamic memory and send the instructions over a telephone line using a modem. A modem local to computer system 600 can receive the data on the telephone line and use an infra-red transmitter to convert the data to an infra-red signal. An infra-red detector can receive the data carried in the infra-red signal and appropriate circuitry can place the data on bus 602. Bus 602 carries the data to main memory 606, from which processor 604 retrieves and executes the instructions. The instructions received by main memory 606 may optionally be stored on storage device 610 either before or after execution by processor 604.

Computer system 600 also includes a communication interface 618 coupled to bus 602. Communication interface 618 provides a two-way data communication coupling to a network link 620 that is connected to a local network 622. For example, communication interface 618 may be an integrated services digital network (ISDN) card, cable modem, satellite modem, or a modem to provide a data communication connection to a corresponding type of telephone line. As another example, communication interface 618 may be a local area network (LAN) card to provide a data communication connection to a compatible LAN. Wireless links may also be implemented. In any such implementation, communication interface 618 sends and receives electrical, electromagnetic or optical signals that carry digital data streams representing various types of information.

Network link 620 typically provides data communication through one or more networks to other data devices. For example, network link 620 may provide a connection through local network 622 to a host computer 624 or to data equipment operated by an Internet Service Provider (ISP) 626. ISP 626 in turn provides data communication services through the world wide packet data communication network now commonly referred to as the "Internet" 628. Local network 622 and Internet 628 both use electrical, electromagnetic or optical signals that carry digital data streams. The signals through the various networks and the signals on network link 620 and through communication interface 618, which carry the digital data to and from computer system 600, are example forms of transmission media.

Computer system 600 can send messages and receive data, including program code, through the network(s), network link 620 and communication interface 618. In the Internet example, a server 630 might transmit a requested code for an application program through Internet 628, ISP 626, local network 622 and communication interface 618.

The received code may be executed by processor 604 as it is received, and/or stored in storage device 610, or other non-volatile storage for later execution.

7. EQUIVALENTS, EXTENSIONS, ALTERNATIVES AND MISCELLANEOUS

In the foregoing specification, example embodiments of the invention have been described with reference to numerous specific details that may vary from implementation to implementation. Thus, the sole and exclusive indicator of what is the invention, and is intended by the applicants to be the invention, is the set of claims that issue from this application, in the specific form in which such claims issue, including any subsequent correction. Any definitions expressly set forth herein for terms contained in such claims shall govern the meaning of such terms as used in the claims. Hence, no limitation, element, property, feature, advantage or attribute that is not expressly recited in a claim should limit the scope of such claim in any way. The specification and drawings are, accordingly, to be regarded in an illustrative rather than a restrictive sense.

What is claimed is:

1. A method, comprising:
   receiving a first input 3D image in a sequence of input 3D images, the first input 3D image having a first input image frame for a first perspective and a second input image frame for a second different perspective;
   selecting, based on one or more deciding factors, from a plurality of different types of data compositions, a first specific type of data composition to be used to transmit first enhancement layer (EL) image data in an enhancement layer;
   deriving image data in a plurality of color channels of an adopted color space using one or both of the first input image frame and the second input image frame; and
   encoding and outputting the image data in the plurality of color channels as the first EL image data in the first specific type of data composition;
   selecting, based on one or more deciding factors, from the plurality of different types of data compositions, a second specific type of data composition to be used to transmit second EL image data in the enhancement layer; wherein the second specific type of data composition differs from the first specific type of data composition; wherein encoding and outputting of image data as second EL image data in the second specific type of data composition transitions gradually from encoding and outputting of image data as first EL image data in the first specific type of data composition over a plurality of input 3D images from the sequence of input 3D images, wherein said deciding factors include any of {audio and video signal characteristics; respective bandwidth requirements of different types of data compositions; a bandwidth constraint on a current network connection between an upstream device and a recipient device, a maximal, average, or minimal bitrate supported by a current network connection; a quality of service measure of a current network connection}.

2. The method as recited in claim 1, further comprising:
   generating, based on the first input image frame and the second input image frame, reduced resolution image data for the first perspective and the second perspective; and
   encoding and outputting the reduced resolution image data in a base layer.

3. The method as recited in claim 2, wherein the image data in the plurality of color channels comprises unfiltered high spatial frequency content derived from the one or more of the first and second input image frames and wherein the reduced resolution image data comprises filtered image data derived from the first and second input image frames.

4. The method as recited in claim 2, further comprising:
   generating, based at least in part on the reduced resolution image data and a set of reference parameters, a plurality of prediction reference values;
   computing the image data in the plurality of color channels as a plurality of residual values between the plurality of prediction reference values and a plurality of pixel values in the plurality of color channels in at least one of the first and second input image frames; and
   encoding and outputting the set of reference parameters with the image data in the plurality of color channels.

5. The method as recited in claim 1, wherein the sequence of input 3D images comprises a second different input 3D image having a third input image frame for the first perspective and a fourth input image frame for the second perspective; and wherein encoding and outputting of image data as second EL image data in the second specific type of data composition comprises:
   deriving second image data in a plurality of second color channels from one or both of the third input image frame and the fourth input image frame; and
   encoding and outputting the second image data in the plurality of second color channels as the second EL image data in the second specific type of data composition.

6. The method as recited in claim 5, wherein a first EL image data descriptor that indicates the first specific type of data composition for the first EL image data is outputted in the enhancement layers with the first EL image data, and wherein a second different EL image data descriptor that indicates the second specific type of data composition for the second EL image data is outputted in the enhancement layers with the second image data.

7. The method as recited in claim 6, wherein a sequence of EL image data descriptors is outputted in the enhancement layers with image data derived from the sequence of input 3D images; wherein the first EL image data descriptor immediately precedes the second EL image data descriptor in the sequence of EL image data descriptors, and wherein the first EL image data descriptor transitions to the second EL image data descriptor in the sequence of EL image data descriptors at one of a frame level, a scene level, or a fixed duration level.

8. The method as recited in claim 1, wherein the plurality of color channels comprises at least one color channel in one of an RGB color space, an YCbCr color space, or other color spaces.

9. The method as recited in claim 1, wherein an image container is used to hold the image data in the plurality of color channels, wherein the image container comprises two or more data portions sampled under a sampling scheme, wherein the image container is selected from a plurality of image containers associated with a plurality of sampling schemes, and wherein the plurality of sampling schemes comprises at least a 4-4-4 sampling scheme, a 4-2-2 sampling scheme, a 4-2-0 sampling scheme, or other sampling schemes.

10. The method as recited in claim 1, wherein the plurality of different types of data compositions comprises one or more of (a) complementary filtered reduced resolution image data that complements filtered reduced resolution image data transmitted through a base layer, (b) unfiltered full resolution image data for one of the first and second perspectives, (c)

complete unfiltered full resolution luminance image data for the first perspective and half resolution luminance image data for the second perspective, (d) unfiltered full resolution luminance image data derived from selected portions of the first and second input image frames, (e) complete unfiltered full resolution luminance image data for the first perspective and partial unfiltered full resolution luminance image data for the second perspective, and (f) one or more fallback types of data compositions by replacing at least a portion of image data with pel values.

11. The method as recited in claim 1, further comprising converting one or more input 3D images represented, received, transmitted, or stored with one or more input video signals into one or more output 3D images represented, received, transmitted, or stored with one or more output video signals.

12. The method as recited in claim 1, wherein at least one of the first input 3D image and the first EL image data comprises image data encoded in one of a high dynamic range (HDR) image format, a RGB color space associated with the Academy Color Encoding Specification (ACES) standard of the Academy of Motion Picture Arts and Sciences (AMPAS), a P3 color space standard of the Digital Cinema Initiative, a Reference Input Medium Metric/Reference Output Medium Metric (RIMM/ROMM) standard, an sRGB color space, or a RGB color space associated with the BT.709 Recommendation standard of the International Telecommunications Union (ITU).

13. A method, comprising:
receiving input reduced resolution image data for a first perspective and a second different perspective of a 3D image in a base layer and input enhancement layer (EL) image data of the 3D image and receiving an input EL image data descriptor in an enhancement layer, the input EL image data descriptor indicating a first specific type of data composition for the input EL image data in the enhancement layer; wherein the 3D image is in a sequence of 3D images whose image data is received from both the base layer and the enhancement layer;
deriving from the input EL image data, based at least in part on the first specific type of data composition as indicated by the input EL image data descriptor, image data of the 3D image in a plurality of color channels of an adopted color space;
generating, based on the image data in the plurality of color channels with the input reduced resolution image data, a first output image frame for the first perspective and a second output image frame for the second perspective; and
rendering the 3D image by rendering the first output image frame for the first perspective and by rendering the second output image frame for the second perspective;
receiving a second input EL image data descriptor in the enhancement layer, the second EL image data descriptor indicating a second specific type of data composition for second EL image data in the enhancement layer for a second 3D image in the sequence of 3D images; wherein the second specific type of data composition differs from the first specific type of data composition; wherein deriving of image data in the plurality of color channels based at least in part on the second specific type of data composition transitions gradually from deriving of image data in the plurality of color channels based at least in part on the first specific type of data composition over a plurality of 3D images from the sequence of 3D images.

14. The method as recited in claim 13, wherein the image data in the plurality of color channels comprises unfiltered high spatial frequency content in the plurality of color channels derived from unfiltered full resolution source image data and wherein the input reduced resolution image data comprises filtered image data derived from the unfiltered full resolution source image data.

15. The method as recited in claim 13, further comprising:
receiving a set of input reference parameters in the enhancement layer;
generating, based at least in part on the input reduced resolution image data and the set of input reference parameters, a plurality of prediction reference values; and
combining residual values in the image data in the plurality of color channels and the plurality of prediction reference values into a plurality of pixel values in the plurality of color channels in at least one of the first and second output image frames.

16. The method as recited in claim 13, the method further comprising:
receiving second input reduced resolution image data for the first perspective and the second perspective of the second 3D image in the base layer and second input EL image data of the second 3D image;
deriving from the second EL image data, based at least in part on the second specific type of data composition as indicated by the second EL image data descriptor, second image data of the second 3D image in a plurality of second color channels;
generating, based on the second image data in the plurality of second color channels with the second input reduced resolution image data, a third output image frame for the first perspective and a fourth output image frame for the second perspective; and
rendering the second 3D image by rendering the third output image frame for the first perspective and by rendering the fourth output image frame for the second perspective.

17. The method as recited in claim 16, wherein a sequence of input EL image data descriptors is inputted in the enhancement layers with image data for the sequence of 3D images; wherein the first input EL image data descriptor immediately precedes the second input EL image data descriptor in the sequence of input EL image data descriptors; and wherein the first input EL image data descriptor transitions to the second input EL image data descriptor in the sequence of EL image data descriptors at one of a frame level, a scene level, or a fixed duration level.

18. The method as recited in claim 13, wherein the plurality of color channels comprises at least one color channel in one of an RGB color space, an YCbCr color space, or other color spaces.

19. The method as recited in claim 13, wherein an image container is used to hold the image data in the plurality of color channels, wherein the image container comprises two or more data portions sampled under a sampling scheme, wherein the image container is among a plurality of image containers associated with a plurality of sampling schemes, and wherein the plurality of sampling schemes comprises at least a 4-4-4 sampling scheme, a 4-2-2 sampling scheme, a 4-2-0 sampling scheme, or other sampling schemes.

20. The method as recited in claim 13, wherein the plurality of different types of data compositions comprises one or more of (a) complementary filtered reduced resolution image data that complements filtered reduced resolution image data transmitted through a base layer, (b) unfiltered full resolution image data for one of the first and second perspectives, (c) complete unfiltered full resolution luminance image data for the first perspective and half resolution luminance image data for the second perspective, (d) unfiltered full resolution luminance image data derived from selected portions of the first and second input image frames, (e) complete unfiltered full resolution luminance image data for the first perspective and partial unfiltered full resolution luminance image data for the second perspective, and (f) one or more fallback types of data compositions by replacing at least a portion of image data with pel values.

21. The method as recited in claim 13, further comprising processing one or more 3D images represented, received, transmitted, or stored with one or more input video signals.

22. The method as recited in claim 13, wherein at least a portion of the input reduced resolution image data or the input EL image data comprises image data encoded in one of a high dynamic range (HDR) image format, a RGB color spaces associated with the Academy Color Encoding Specification (ACES) standard of the Academy of Motion Picture Arts and Sciences (AMPAS), a P3 color space standard of the Digital Cinema Initiative, a Reference Input Medium Metric/Reference Output Medium Metric (RIMM/ROMM) standard, an sRGB color space, or a RGB color space associated with the BT.709 Recommendation standard of the International Telecommunications Union (ITU).

* * * * *